(12) United States Patent
Daugherty

(10) Patent No.: US 12,245,639 B2
(45) Date of Patent: Mar. 11, 2025

(54) ADAPTIVE SIGNAL ARCHITECTURE FOR INITIATING AND TESTING STATE TRANSITIONS IN AN AEROSOL GENERATION DEVICE

(71) Applicant: RAI Strategic Holdings, Inc., Winston-Salem, NC (US)

(72) Inventor: Sean Daugherty, Winston-Salem, NC (US)

(73) Assignee: RAI STRATEGIC HOLDINGS, INC., Winston-Salem, NC (US)

( * ) Notice: Subject to any disclaimer, the term of this patent is extended or adjusted under 35 U.S.C. 154(b) by 638 days.

(21) Appl. No.: 17/490,731

(22) Filed: Sep. 30, 2021

(65) Prior Publication Data

US 2023/0099363 A1    Mar. 30, 2023

(51) Int. Cl.
A24F 40/65    (2020.01)
A24F 40/80    (2020.01)
H04L 9/32    (2006.01)

(52) U.S. Cl.
CPC .............. A24F 40/65 (2020.01); A24F 40/80 (2020.01); H04L 9/3239 (2013.01)

(58) Field of Classification Search
CPC ......... A24F 40/80; A24F 40/65; H04L 9/3239
See application file for complete search history.

(56) References Cited

U.S. PATENT DOCUMENTS

| | | | |
|---|---|---|---|
| 11,200,770 B2 * | 12/2021 | Hubbard | G06F 21/32 |
| 2015/0019650 A1 | 1/2015 | Logue et al. | |
| 2016/0050974 A1 | 2/2016 | Galloway et al. | |
| 2016/0363570 A1 | 12/2016 | Blackley | |
| 2020/0000143 A1 | 1/2020 | Anderson et al. | |
| 2020/0315259 A1 | 10/2020 | Hubbard et al. | |
| 2020/0315260 A1 | 10/2020 | Hubbard | |
| 2020/0315261 A1 | 10/2020 | Hubbard et al. | |
| 2020/0359703 A1 * | 11/2020 | Daugherty | G06F 21/44 |
| 2022/0079242 A1 * | 3/2022 | Daugherty | H04B 10/11 |
| 2022/0117314 A1 * | 4/2022 | Daugherty | G06F 1/3287 |
| 2022/0354185 A1 * | 11/2022 | Garris | A24F 40/53 |

(Continued)

FOREIGN PATENT DOCUMENTS

WO    20200249789 A1    12/2020

OTHER PUBLICATIONS

International Search Report and Written Opinion of International Application No. PCT/US2022/044524, mailed Jan. 19, 2023, all pages cited in its entirety.

(Continued)

*Primary Examiner* — Hae Moon Hyeon
(74) *Attorney, Agent, or Firm* — Burr & Forman LLP

(57) ABSTRACT

A test fixture for testing aerosol provision devices includes a housing, a plurality of testing modules disposed at the housing where each of the testing modules includes a cavity configured to receive a portion of an aerosol provision device, and processing circuitry operably coupled to the testing modules. Each of the testing modules is configured to interface with an assembly of a respective one of the aerosol provision devices to transition the assembly between an initial state and a transitioned state during a functional test controlled by the processing circuitry. The processing circuitry is configured to conduct the functional test of at least two of the testing modules simultaneously.

15 Claims, 9 Drawing Sheets

(56) References Cited

U.S. PATENT DOCUMENTS

| | | | |
|---|---|---|---|
| 2022/0354186 A1* | 11/2022 | Garris | A24F 40/53 |
| 2023/0180849 A1* | 6/2023 | Novak, III | A24F 40/53 |
| | | | 131/329 |
| 2023/0180852 A1* | 6/2023 | Daugherty | A24F 40/80 |
| | | | 131/328 |
| 2024/0023625 A1* | 1/2024 | Daugherty | A24F 40/42 |
| 2024/0049802 A1* | 2/2024 | Daugherty | A24F 40/60 |
| 2024/0057680 A1* | 2/2024 | Daugherty | A24F 40/53 |

OTHER PUBLICATIONS

Wang, et al, "Design of networked monitor system for environmental radioactive aerosol," 2018 IEEE 4th Information Technology and Mechatronics Engineering Conference (ITOEC), 2018, pp. 606-610, Chongqing, China.

* cited by examiner

FIG. 1A.

ADAPTIVE SIGNAL ARCHITECTURE FOR INITIATING AND TESTING STATE TRANSITIONS IN AN AEROSOL GENERATION DEVICE

TECHNICAL FIELD

Example embodiments generally relate to non-combustible aerosol provision systems and, in particular, relate to a device and system for testing and confirming the capability of an aerosol provision device to conduct post sale activation (PSA).

BACKGROUND

Non-combustible aerosol provision systems (e.g., e-cigarettes/tobacco heating products or other such devices) generally contain an aerosolisable material, such as a reservoir of a source liquid containing a formulation. The formulation typically includes nicotine, or a solid material such as a tobacco-based product, from which an aerosol is generated for inhalation by a user, for example through heat vaporization. However, devices including formulations with other materials, such as cannabinoids (e.g., Tetrahydrocannabinol (THC) and/or Cannabidiol (CBD)), botanicals, medicinals, caffeine, and/or other active ingredients, are also possible. Thus, a non-combustible aerosol provision system will typically include an aerosol generation chamber containing a vaporizer, e.g., a heater, arranged to vaporize a portion of the aerosolisable material to generate an aerosol in the aerosol generation chamber. As a user inhales on a mouthpiece of the device and electrical power is supplied to the heater, air is drawn into the device and into the aerosol generation chamber where the air mixes with the vaporized aerosolisable material and forms a condensation aerosol. There is a flow path between the aerosol generation chamber and an opening in the mouthpiece so the air drawn through the aerosol generation chamber continues along the flow path to an opening in the mouthpiece, carrying some of the condensation aerosol with it, and out through the opening in the mouthpiece for inhalation by the user.

Aerosol provision systems include, for example, vapor products, such as those delivering nicotine that are commonly known as "electronic cigarettes," "e-cigarettes" or electronic nicotine delivery systems (ENDS), as well as heat-not-burn products including tobacco heating products (THPs). Many of these products take the form of a system including a device and a consumable, and it is the consumable that includes the material from which the substance to be delivered originates. Typically, the device is reusable, and the consumable is single-use (although some consumables are refillable as in the case of so called "open" systems). Therefore, in many cases, the consumable is sold separately from the device, and often in a multipack. Moreover, subsystems and some individual components of devices or consumables may be sourced from specialist manufacturers.

Aerosol provision devices, like those described above, may be subject to certain restrictions, including age restrictions. In some locations, use of the articles including the cartridges of an ENDS device is limited based on user age. To accommodate the need for authentication of a device by an age verified user, any of a number of authentication methods may be employed. However, many of these authentication methods may require interaction with a host device (e.g., a smartphone or other wireless communication device that can access authentication services). These authentication methods may therefore rely on the ability of the user to effectively carry on the interaction between the host device and the aerosol provision device in order to seamlessly complete the authentication process.

Providing a signaling paradigm to enable locking and unlocking of the aerosol provision device for PSA is typically part of each and every new product release, and may even occur anew when existing products are upgraded or have certain features or capabilities added. Thus, for each new product, model or release, an entirely new signaling paradigm would be required. Any device used to test aerosol provision devices prior to distribution would then also need to be newly designed. This adds significant cost and complexity to every rollout of a new device, model or feature. Accordingly, it may be desirable to introduce methods, devices or systems that ensure the reliability of the aerosol provision devices relative to their proper setup for PSA, but also do so in the context of a highly adaptive environment that need not be scrapped and redesigned each time improvements are made to the aerosol provision device.

BRIEF SUMMARY OF SOME EXAMPLES

In an example embodiment, a test fixture for testing aerosol provision devices may be provided. The test fixture may include one or more testing modules including a cavity configured to receive a portion of an aerosol provision device, and processing circuitry operably coupled to the one or more testing modules. The processing circuitry may be configured to provide a transition signal to the aerosol provision device to transition the aerosol provision device between an initial state and a transitioned state during a functional test controlled by the processing circuitry. The transition signal may have a message format comprising a plurality of fields including a data portion, and a length indicator. The length indicator may indicate an anticipated length of the transition signal based on providing information on contents of one or more other fields of the message format.

In another example embodiment, a method for generating a message to perform a functional state transition test of a power unit of an aerosol provision device may be provided. The method may include receiving a unique identifier from the power unit responsive to operable coupling of the power unit to a test fixture, determining a transition code based on the unique identifier, generating a transition signal including the transition code and a length indicator, and providing the transition code to the power unit via the transition signal to transition the power unit from an initial state to a transitioned state. The transition signal has a message format comprising a plurality of fields including a data portion, and a length indicator. The length indicator may also indicate an anticipated length of the transition signal based on providing information on contents of one or more other fields of the message format.

It will be appreciated that this Brief Summary is provided merely for purposes of summarizing some example implementations to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 1A illustrates a general block diagram of a non-combustible aerosol provision system that may be used in connection with an example embodiment;

DETAILED DESCRIPTION

Figure 1B:
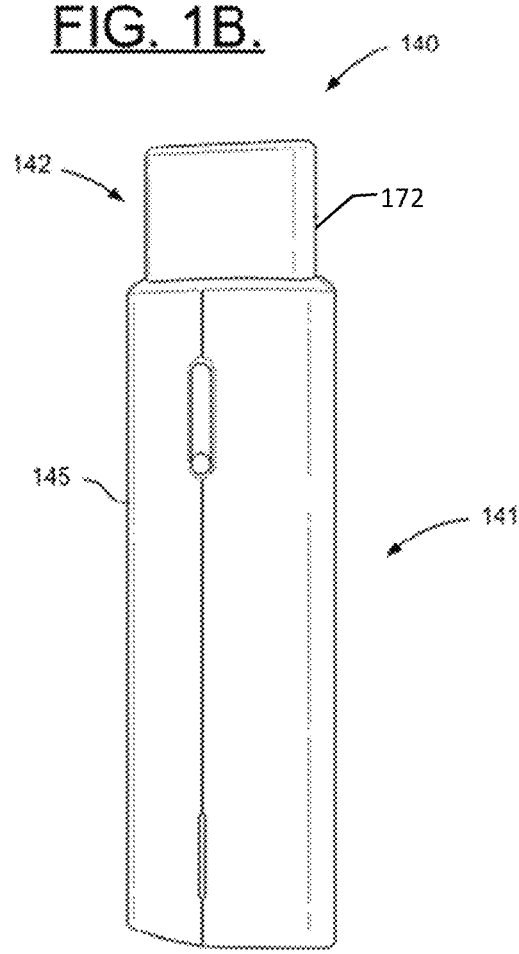
FIGS. 1B and 1C illustrate an aerosol provision system in the form of a vapor product, according to some example implementations.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

As indicated above, the present disclosure relates to requiring an authentication of an age-restricted device, such as an aerosol delivery device or an electronic nicotine delivery systems ("ENDS") device. The authentication may include or require a prior age verification, such that the age-restricted device is not operational for a user that is not age-verified. The authentication may include the age-restricted device receiving a control signal for authenticating the device. The control signal may include audio signals and/or visual/optical signals for authenticating the device. In some case, the authentication may be initiated after a device wakeup procedure, in order to conserve power prior to authentication. However, in any case, the authentication (and/or wakeup) may be initiated by insertion of a dedicated module into the device. The module may therefore be added to minimize changes to existing ENDS device designs.

An aerosol delivery device or ENDS is one example of a device that may be associated with restriction, such as an age restriction. Other examples include delivery devices for delivery of cannabinoids, such as Tetrahydrocannabinol (THC) and/or Cannabidiol (CBD), botanicals, medicinals, and/or other active ingredients. Thus, it will be appreciated that while an aerosol delivery or ENDS device is used as an example application of various embodiments throughout, this example is intended to be non-limiting such that inventive concepts disclosed herein can be used with devices other than aerosol delivery or ENDS devices, including aerosol delivery devices that may be used to deliver other medicinal and/or active ingredients to a user or may include smokeless tobacco or other tobacco products.

The device authentication by a control signal can be in addition to, or may be required as a prerequisite to, the user performing age verification. A user that has not been age verified cannot authenticate a device. The authentication may need to be performed periodically for usage of an age-restricted product. There may be an age verification system for confirming an age of a user and/or authenticating the proper user and/or device. In any case, these activities may be referred to generally as post sale activation (PSA). The conduct of PSA is generally well received by consumers as long as the procedures for conducting PSA are relatively straightforward to employ. That said, if consumers encounter technical problems with any degree of frequency in the performance of PSA, negative impacts on brand loyalty and overall product usage can be expected. Thus, it may be desirable to confirm, prior to shipping of aerosol delivery devices for distribution, that each such device can be properly locked and unlocked. Example embodiments may provide a test fixture and/or methods for ensuring that aerosol delivery devices are functionally equipped to be locked and unlocked in association with PSA.

Given that example embodiments may be employed in connection with providing security for non-combustible aerosol provision systems such as ENDS devices, a general description of an example device will be provided since some aspects of the test fixture may be tailored to interface with the case and/or other structural aspects of the ENDS devices.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure are generally directed to test fixtures or methods for interfacing with delivery systems designed to deliver at least one substance to a user, such as to satisfy a particular "consumer moment." The substance may include constituents that impart a physiological effect on the user, a sensorial effect on the user, or both.

Delivery systems may take many forms. Examples of suitable delivery systems include aerosol provision systems such as powered aerosol provision systems designed to release one or more substances or compounds from an aerosol-generating material without combusting the aerosol-generating material. These aerosol provision systems may at times be referred to as non-combustible aerosol provision systems, aerosol delivery devices or the like, and the aerosol-generating material may be, for example, in the form of a solid, semi-solid, liquid or gel and may or may not contain nicotine.

Examples of suitable aerosol provision systems include vapor products, heat-not-burn products, hybrid products and the like. Vapor products are commonly known as "electronic cigarettes," "e-cigarettes" or electronic nicotine delivery systems (ENDS), although the aerosol-generating material need not include nicotine. Many vapor products are designed to heat a liquid material to generate an aerosol. Other vapor products are designed to break up an aerosol-generating material into an aerosol without heating, or with only secondary heating. Heat-not-burn products include tobacco heating products (THPs) and carbon-tipped tobacco heating products (CTHPs), and many are designed to heat a solid material to generate an aerosol without combusting the material.

Hybrid products use a combination of aerosol-generating materials, one or a plurality of which may be heated. Each of the aerosol-generating materials may be, for example, in the form of a solid, semi-solid, liquid, or gel. Some hybrid products are similar to vapor products except that the aerosol generated from a liquid or gel aerosol-generating material passes through a second material (such as tobacco) to pick up additional constituents before reaching the user. In some example implementations, the hybrid system includes a liquid or gel aerosol-generating material, and a solid aerosol-generating material. The solid aerosol-generating material may include, for example, tobacco or a non-tobacco product.

FIG. 1A is a block diagram of an aerosol provision system 100 according to some example implementations. In various examples, the aerosol provision system may be a vapor product, heat-not-burn product or hybrid product. The aerosol provision system includes one or more of each of a number of components including, for example, an aerosol provision device 102, and a consumable 104 (sometimes referred to as an article) for use with the aerosol provision device. The aerosol provision system also includes an aerosol generator 106. In various implementations, the aerosol generator may be part of the aerosol provision device or the consumable. In other implementations, the aerosol generator may be separate from the aerosol provision device and the consumable, and removably engaged with the aerosol provision device and/or the consumable.

In various examples, the aerosol provision system 100 and its components including the aerosol provision device 102 and the consumable 104 may be reusable or single-use. In some examples, the aerosol provision system including both the aerosol provision device and the consumable may be single use. In some examples, the aerosol provision device may be reusable, and the consumable may be reusable (e.g., refillable) or single use (e.g., replaceable). In yet further examples, the consumable may be both refillable and also replaceable. In examples in which the aerosol generator 106 is part of the aerosol provision device or the consumable, the aerosol generator may be reusable or single-use in the same manner as the aerosol provision device or the consumable.

In some example implementations, the aerosol provision device 102 may include a housing 108 with a power source 110 and circuitry 112. The power source is configured to provide a source of power to the aerosol provision device and thereby the aerosol provision system 100. The power source may be or include, for example, an electric power source such as a non-rechargeable battery or a rechargeable battery, solid-state battery (SSB), lithium-ion battery, supercapacitor, or the like.

The circuitry 112 may be configured to enable one or more functionalities (at times referred to as services) of the aerosol provision device 102 and thereby the aerosol provision system 100. The circuitry includes electronic components, and in some examples one or more of the electronic components may be formed as a circuit board such as a printed circuit board (PCB).

In some examples, the circuitry 112 includes at least one switch 114 that may be directly or indirectly manipulated by a user to activate the aerosol provision device 102 and thereby the aerosol provision system 100. The switch may be or include a pushbutton, touch-sensitive surface or the like that may be operated manually by a user. Additionally or alternatively, the switch may be or include a sensor configured to sense one or more process variables that indicate use of the aerosol provision device or aerosol provision system. One example is a flow sensor, pressure sensor, pressure switch or the like that is configured to detect airflow or a change in pressure caused by airflow when a user draws on the consumable 104.

The switch 114 may provide user interface functionality. In some examples, the circuitry 112 may include a user interface (UI) 116 that is separate from or that is or includes the switch. The UI may include one or more input devices and/or output devices to enable interaction between the user and the aerosol provision device 102. As described above with respect to the switch, examples of suitable input devices include pushbuttons, touch-sensitive surfaces and the like. The one or more output devices generally include devices configured to provide information in a human-perceptible form that may be visual, audible or tactile/haptic. Examples of suitable output devices include light sources such as light-emitting diodes (LEDs), quantum dot-based LEDs and the like. Other examples of suitable output devices include display devices (e.g., electronic visual displays), touchscreens (integrated touch-sensitive surface and display device), loudspeakers, vibration motors and the like.

In some examples, the circuitry 112 includes processing circuitry 118 configured to perform data processing, application execution, or other processing, control or management services according to one or more example implementations. The processing circuitry may include a processor embodied in a variety of forms such as at least one processor core, microprocessor, coprocessor, controller, microcontroller or various other computing or processing devices including one or more integrated circuits such as, for example, an ASIC (application specific integrated circuit), an FPGA (field programmable gate array), some combination thereof, or the like. In some examples, the processing circuitry may include memory coupled to or integrated with the processor, and which may store data, computer program instructions executable by the processor, some combination thereof, or the like.

As also shown, in some examples, the housing 108 and thereby the aerosol provision device 102 may also include a coupler 120 and/or a receptacle 122 structured to engage and hold the consumable 104, and thereby couple the aerosol provision device with the consumable. The coupler may be or include a connector, fastener or the like that is configured to connect with a corresponding coupler of the consumable, such as by a press fit (or interference fit) connection, threaded connection, magnetic connection or the like. The receptacle may be or include a reservoir, tank, container, cavity, receiving chamber or the like that is structured to receive and contain the consumable or at least a portion of the consumable.

The consumable 104 is an article including aerosol-generating material 124 (also referred to as an aerosol precursor composition), part or all of which is intended to be consumed during use by a user. The aerosol provision system 100 may include one or more consumables, and each consumable may include one or more aerosol-generating materials. In some examples in which the aerosol provision system is a hybrid product, the aerosol provision system may include a liquid or gel aerosol-generating material to generate an aerosol, which may then pass through a second, solid aerosol-generating material to pick up additional constituents before reaching the user. These aerosol-generating materials may be within a single consumable or respective consumables that may be separately removable.

The aerosol-generating material 124 is capable of generating aerosol, for example when heated, irradiated or energized in any other way. The aerosol-generating material may be, for example, in the form of a solid, semi-solid, liquid or gel. The aerosol-generating material may include an "amorphous solid," which may be alternatively referred to as a "monolithic solid" (i.e., non-fibrous). In some examples, the amorphous solid may be a dried gel. The amorphous solid is a solid material that may retain some fluid, such as liquid, within it. In some examples, the aerosol-generating material may include from about 50 wt %, 60 wt % or 70 wt % of amorphous solid, to about 90 wt %, 95 wt % or 100 wt % of amorphous solid.

The aerosol-generating material 124 may include one or more of each of a number of constituents such as an active substance 126, flavorant 128, aerosol-former material 130 or other functional material 132.

The active substance 126 may be a physiologically active material, which is a material intended to achieve or enhance a physiological response such as improved alertness, improved focus, increased energy, increased stamina, increased calm or improved sleep. The active substance may for example be selected from nutraceuticals, nootropics, psychoactives. The active substance may be naturally occurring or synthetically obtained. The active substance may include, for example, nicotine, caffeine, GABA (γ-aminobutyric acid), L-theanine, taurine, theine, vitamins such as B6 or B12 (cobalamin) or C, melatonin, cannabinoids, terpenes, or constituents, derivatives, or combinations thereof. The active substance may include one or more constituents, derivatives or extracts of tobacco, cannabis or another botanical.

In some examples in which the active substance 126 includes derivatives or extracts, the active substance may be or include one or more cannabinoids or terpenes.

As noted herein, the active substance 126 may include or be derived from one or more botanicals or constituents, derivatives or extracts thereof. As used herein, the term "botanical" includes any material derived from plants including, but not limited to, extracts, leaves, bark, fibers, stems, roots, seeds, flowers, fruits, pollen, husk, shells or the like. Alternatively, the material may include an active compound naturally existing in a botanical, obtained synthetically. The material may be in the form of liquid, gas, solid, powder, dust, crushed particles, granules, pellets, shreds, strips, sheets, or the like. Example botanicals are tobacco, *Eucalyptus*, star anise, hemp, cocoa, cannabis, fennel, lemongrass, peppermint, spearmint, rooibos, chamomile, flax, ginger, *Ginkgo biloba*, hazel, hibiscus, laurel, licorice (liquorice), matcha, mate, orange skin, papaya, rose, sage, tea such as green tea or black tea, thyme, clove, cinnamon, coffee, aniseed (anise), basil, bay leaves, cardamom, coriander, cumin, nutmeg, oregano, paprika, rosemary, saffron, lavender, lemon peel, mint, juniper, elderflower, vanilla, wintergreen, beefsteak plant, curcuma, turmeric, sandalwood, cilantro, bergamot, orange blossom, myrtle, cassis, valerian, pimento, mace, damien, marjoram, olive, lemon balm, lemon basil, chive, carvi, verbena, tarragon, geranium, mulberry, ginseng, theanine, theacrine, maca, ashwagandha, damiana, guarana, chlorophyll, baobab or any combination thereof. The mint may be chosen from the following mint varieties: *Mentha arventis, Mentha* c.v., *Mentha niliaca, Mentha piperita, Mentha piperita citrata* c.v., *Mentha piperita* c.v, *Mentha spicata crispa, Mentha cardifolia, Mentha longifolia, Mentha suaveolens variegata, Mentha pulegium, Mentha spicata* c.v. and *Mentha suaveolens*.

In yet other examples, the active substance 126 may be or include one or more of 5-hydroxytryptophan (5-HTP)/oxitriptan/*Griffonia simplicifolia*, acetylcholine, arachidonic acid (AA, omega-6), ashwagandha (Withania somnifera), *Bacopa monniera*, beta alanine, beta-hydroxy-beta-methylbutyrate (HMB), *Centella asiatica*, chai-hu, cinnamon, citicoline, cotinine, creatine, curcumin, docosahexaenoic acid (DHA, omega-3), dopamine, *Dorstenia arifolia, Dorstenia odorata*, essential oils, GABA, *Galphimia glauca*, glutamic acid, hops, *Kaempferia parviflora* (Thai ginseng), kava, L-carnitine, L-arginine, lavender oil, L-choline, liquorice, L-lysine, L-theanine, L-tryptophan, lutein, magnesium, magnesium L-threonate, myo-inositol, *nardostachys chinensis*, nitrate, oil-based extract of *Viola odorata*, oxygen, phenylalanine, phosphatidylserine, quercetin, resveratrol, *Rhizoma gastrodiae, Rhodiola, Rhodiola rosea*, rose essential oil, S-adenosylmethionine (SAMe), *Sceletium tortuosum*, Schisandra, selenium, serotonin, skullcap, spearmint extract, spikenard, theobromine, tumaric, *Turnera aphrodisiaca*, tyrosine, vitamin A, vitamin B3, or yerba mate.

In some example implementations, the aerosol-generating material 124 includes a flavorant 128. As used herein, the terms "flavorant" and "flavor" refer to materials which, where local regulations permit, may be used to create a desired taste, aroma or other somatosensorial sensation in a product for adult consumers. Flavorants may include naturally occurring flavor materials, botanicals, extracts of botanicals, synthetically obtained materials, or combinations thereof (e.g., tobacco, cannabis, licorice (liquorice), hydrangea, eugenol, Japanese white bark magnolia leaf, chamomile, fenugreek, clove, maple, matcha, menthol, Japanese mint, aniseed (anise), cinnamon, turmeric, Indian spices, Asian spices, herb, wintergreen, cherry, berry, redberry, cranberry, peach, apple, orange, mango, clementine, lemon, lime, tropical fruit, papaya, rhubarb, grape, durian, dragon fruit, cucumber, blueberry, mulberry, citrus fruits, Drambuie, bourbon, scotch, whiskey, gin, tequila, rum, spearmint, peppermint, lavender, aloe vera, cardamom, celery, cascarilla, nutmeg, sandalwood, bergamot, geranium, khat, naswar, betel, shisha, pine, honey essence, rose oil, vanilla, lemon oil, orange oil, orange blossom, cherry blossom, cassia, caraway, cognac, jasmine, ylang-ylang, sage, fennel, wasabi, piment, ginger, coriander, coffee, hemp, a mint oil from any species of the genus *Mentha, Eucalyptus*, star anise, cocoa, lemongrass, rooibos, flax, *Ginkgo biloba*, hazel, hibiscus, laurel, mate, orange skin, rose, tea such as green tea or black tea, thyme, juniper, elderflower, basil, bay leaves, cumin, oregano, paprika, rosemary, saffron, lemon peel, mint, beefsteak plant, curcuma, cilantro, myrtle, cassis, valerian, pimento, mace, damien, marjoram, olive, lemon balm, lemon basil, chive, carvi, verbena, tarragon, limonene, thymol, camphene), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. Flavorants may be imitation, synthetic or natural ingredients or blends thereof. Flavorants may be in any suitable form, for example, liquid such as an oil, solid such as a powder, or gas.

In some example implementations, the flavorant 128 may include a sensate, which is intended to achieve a somatosensorial sensation which are usually chemically induced and perceived by the stimulation of the fifth cranial nerve (trigeminal nerve), in addition to or in place of aroma or taste nerves, and these may include agents providing heating, cooling, tingling, numbing effect. A suitable heat effect agent may be, but is not limited to, vanillyl ethyl ether and a suitable cooling agent may be, but not limited to eucolyptol, WS-3.

The aerosol-former material 130 may include one or more constituents capable of forming an aerosol. In some example implementations, the aerosol-former material may include one or more of glycerine, glycerol, propylene glycol, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, and propylene carbonate.

The one or more other functional materials 132 may include one or more of pH regulators, colouring agents, preservatives, binders, fillers, stabilizers, and/or antioxidants. Suitable binders include, for example, pectin, guar gum, fruit pectin, citrus pectin, tobacco pectin, hydroxyethyl guar gum, hydroxypropyl guar gum, hydroxyethyl locust bean gum, hydroxypropyl locust bean gum, alginate, starch, modified starch, derivatized starch, methyl cellulose, ethyl cellulose, ethylhydroxymethyl cellulose, carboxymethyl cellulose, tamarind gum, dextran, pullalon, konjac flour or xanthan gum.

In some example implementations, the aerosol-generating material 124 may be present on or in a support to form a substrate 134. The support may be or include, for example, paper, card, paperboard, cardboard, reconstituted material (e.g., a material formed from reconstituted plant material, such as reconstituted tobacco, reconstituted hemp, etc.), a plastics material, a ceramic material, a composite material, glass, a metal, or a metal alloy. In some examples, the support includes a susceptor, which may be embedded within the aerosol-generating material, or on one or either side of the aerosol-generating material.

Although not separately shown, in some example implementations, the consumable 104 may further include receptacle structured to engage and hold the aerosol-generating material 124, or substrate 134 with the aerosol-generating material. The receptacle may be or include a reservoir, tank, container, cavity, receiving chamber or the like that is structured to receive and contain the aerosol-generating material or the substrate. The consumable may include an aerosol-generating material transfer component (also referred to as a liquid transport element) configured to transport aerosol-generating material to the aerosol generator 106. The aerosol-generating material transfer component may be adapted to wick or otherwise transport aerosol-generating material via capillary action. In some examples, the aerosol-generating material transfer component may include a microfluidic chip, a micro pump or other suitable component to transport aerosol-generating material.

The aerosol generator 106 (also referred to as an atomizer, aerosolizer or aerosol production component) is configured to energize the aerosol-generating material 124 to generate an aerosol, or otherwise cause generation of an aerosol from the aerosol-generating material. More particularly, in some examples, the aerosol generator may be powered by the power source 110 under control of the circuitry 112 to energize the aerosol-generating material to generate an aerosol.

In some example implementations, the aerosol generator 106 is an electric heater configured to perform electric heating in which electrical energy from the power source is converted to heat energy, which the aerosol-generating material is subject to so as to release one or more volatiles from the aerosol-generating material to form an aerosol. Examples of suitable forms of electric heating include resistance (Joule) heating, induction heating, dielectric and microwave heating, radiant heating, arc heating and the like. More particular examples of suitable electric heaters include resistive heating elements such as wire coils, flat plates, prongs, micro heaters or the like.

In some example implementations, the aerosol generator 106 is configured to cause an aerosol to be generated from the aerosol-generating material without heating, or with only secondary heating. For example, the aerosol generator may be configured to subject the aerosol-generating material to one or more of increased pressure, vibration, or electrostatic energy. More particular examples of these aerosol generators include jet nebulizers, ultrasonic wave nebulizers, vibrating mesh technology (VMT) nebulizers, surface acoustic wave (SAW) nebulizers, and the like.

A jet nebulizer is configured to use compressed gas (e.g., air, oxygen) to break up aerosol-generating material 124 into an aerosol, and an ultrasonic wave nebulizer is configured to use ultrasonic waves to break up aerosol-generating material into an aerosol. A VMT nebulizer includes a mesh, and a piezo material (e.g., piezoelectric material, piezomagnetic material) that may be driven to vibrate and cause the mesh to break up aerosol-generating material into an aerosol. A SAW nebulizer is configured to use surface acoustic waves or Rayleigh waves to break up aerosol-generating material into an aerosol.

In some examples, the aerosol generator 106 may include a susceptor, or the susceptor may be part of the substrate 134. The susceptor is a material that is heatable by penetration with a varying magnetic field generated by a magnetic field generator that may be separate from or part of the aerosol generator. The susceptor may be an electrically-conductive material, so that penetration thereof with a varying magnetic field causes induction heating of the heating material. The heating material may be magnetic material, so that penetration thereof with a varying magnetic field causes magnetic hysteresis heating of the heating material. The susceptor in some examples may be both electrically-conductive and magnetic, so that the susceptor of these examples is heatable by both heating mechanisms.

Although not separately shown, either or both the aerosol provision device 102 or the consumable 104 may include an aerosol-modifying agent. The aerosol-modifying agent is a substance configured to modify the aerosol generated from the aerosol-generating material 124, such as by changing the taste, flavor, acidity or another characteristic of the aerosol. In various examples, the aerosol-modifying agent may be an additive or a sorbent. The aerosol-modifying agent may include, for example, one or more of a flavorant, colorant, water or carbon adsorbent. The aerosol-modifying agent may be a solid, semi-solid, liquid or gel. The aerosol-modifying agent may be in powder, thread or granule form. The aerosol-modifying agent may be free from filtration material. In some examples, the aerosol-modifying agent may be provided in an aerosol-modifying agent release component, that is operable to selectively release the aerosol-modifying agent.

The aerosol provision system 100 and its components including the aerosol provision device 102, consumable 104, and aerosol generator 106 may be manufactured with any of a number of different form factors, and with additional or alternative components relative to those described above.

Figure 1C:
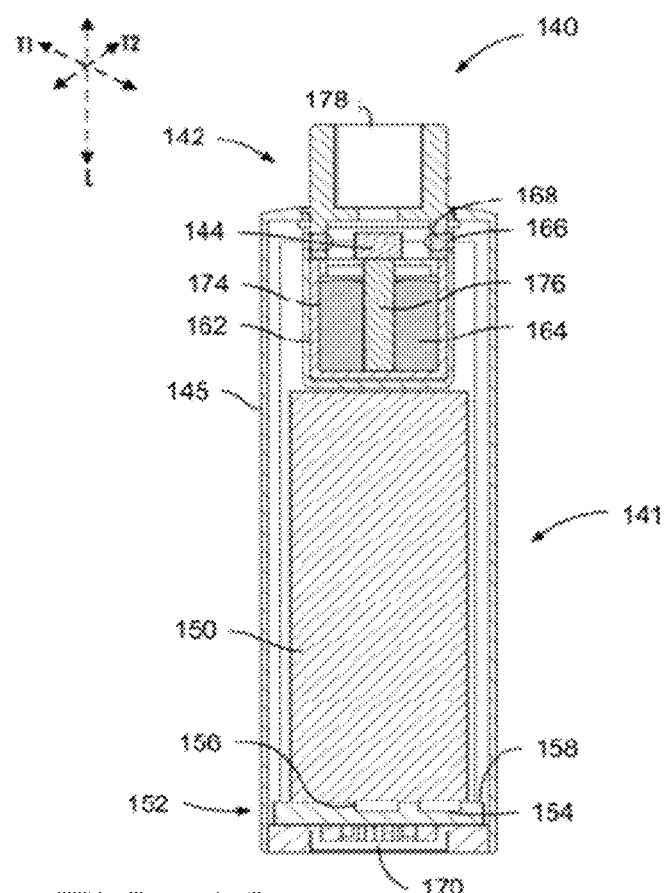

FIGS. 1B and 1C illustrate an aerosol provision system 140 in the form of a vapor product, and that in some example implementations may correspond to the aerosol provision system 100. As shown, the aerosol provision system 140 may include an aerosol provision device 141 (also referred to as a control body or power unit) and a consumable 142 (also referred to as a cartridge or tank), which may correspond to respectively the aerosol provision device 102 and the consumable 104. The aerosol provision system and in particular the consumable may also include an aerosol generator corresponding to the aerosol generator 106, and in the form of an electric heater 144 such as a heating element like a metal plate or metal wire coil configured to convert electrical energy to heat energy through resistance (Joule) heating. The aerosol provision device and the consumable can be permanently or detachably aligned in a functioning relationship. FIGS. 1B and 1C illustrate respectively a perspective view and a partially cut-away side view of the aerosol provision system in a coupled configuration.

As seen in FIG. 1B and the cut-away view illustrated in FIG. 1C, the aerosol provision device 141 and consumable 142 each include a number of respective components. The components illustrated in FIG. 1C are representative of the components that may be present in an aerosol provision device and consumable and are not intended to limit the scope of components that are encompassed by the present disclosure.

The aerosol provision device 141 may include a housing 145 (sometimes referred to as an aerosol provision device shell) that may include a power source 150. The housing may also include circuitry 152 with a switch in the form of a sensor 154, a user interface including a light source 156 that may be illuminated with use of the aerosol provision system 140, and processing circuitry 158 (also referred to as a control component). The housing may also include a receptacle in the form of a consumable receiving chamber 162 structured to engage and hold the consumable 142. And the consumable may include an aerosol-generating material 164 that may correspond to aerosol-generating material 124, and that may include one or more of each of a number of constituents such as an active substance, flavorant, aerosol-former material or other functional material.

As also seen in FIG. 1C, the aerosol provision device 141 may also include electrical connectors 166 positioned in the consumable receiving chamber 162 configured to electrically couple the circuitry and thereby the aerosol provision device with the consumable 142, and in particular electrical contacts 168 on the consumable. In this regard, the electrical connectors and electrical contacts may form a connection interface of the aerosol provision device and consumable. As also shown, the aerosol provision device may include an external electrical connector 170 to connect the aerosol provision device with one or more external devices. Examples of suitable external electrical connectors include USB connectors, proprietary connectors such as Apple's Lightning connector, and the like.

In various examples, the consumable 142 includes a tank portion and a mouthpiece portion. The tank portion and the mouthpiece portion may be integrated or permanently fixed together, or the tank portion may itself define the mouthpiece portion (or vice versa). In other examples, the tank portion and the mouthpiece portion may be separate and removably engaged with one another.

The consumable 142, tank portion and/or mouthpiece portion may be separately defined in relation to a longitudinal axis (L), a first transverse axis (T1) that is perpendicular to the longitudinal axis, and a second transverse axis (T2) that is perpendicular to the longitudinal axis and is perpendicular to the first transverse axis. The consumable can be formed of a housing 172 (sometimes referred to as the consumable shell) enclosing a reservoir 174 (in the tank portion) configured to retain the aerosol-generating material 164. In some examples, the consumable may include an aerosol generator, such as electric heater 144 in the illustrated example. In some examples, the electrical connectors 166 on the aerosol provision device 141 and electrical contacts 168 on the consumable may electrically connect the electric heater with the power source 150 and/or circuitry 152 of the aerosol provision device.

As shown, in some examples, the reservoir 174 may be in fluid communication with an aerosol-generating material transfer component 176 adapted to wick or otherwise transport aerosol-generating material 164 stored in the reservoir housing to the electric heater 144. At least a portion of the aerosol-generating material transfer component may be positioned proximate (e.g., directly adjacent, adjacent, in close proximity to, or in relatively close proximity to) the electric heater. The aerosol-generating material transfer component may extend between the electric heater and the aerosol-generating material stored in the reservoir, and at least a portion of the electric heater may be located above a proximal end the reservoir. For the purposes of the present disclosure, it should be understood that the term "above" in this particular context should be interpreted as meaning toward a proximal end of the reservoir and/or the consumable 142 in direction substantially along the longitudinal axis (L). Other arrangements of the aerosol-generating material transfer component are also contemplated within the scope of the disclosure. For example, in some example implementations, the aerosol-generating material transfer component may be positioned proximate a distal end of the reservoir and/or arranged transverse to the longitudinal axis (L).

The electric heater 144 and aerosol-generating material transfer component 176 may be configured as separate elements that are fluidly connected, the electric heater and aerosol-generating material transfer component or may be configured as a combined element. For example, in some implementations an electric heater may be integrated into an aerosol-generating material transfer component. Moreover, the electric heater and the aerosol-generating material transfer component may be formed of any construction as otherwise described herein. In some examples, a valve may be positioned between the reservoir 174 and electric heater, and configured to control an amount of aerosol-generating material 164 passed or delivered from the reservoir to the electric heater.

An opening 178 may be present in the housing 172 (e.g., at the mouth end of the mouthpiece portion) to allow for egress of formed aerosol from the consumable 142.

As indicated above, the circuitry 152 of the aerosol provision device 141 may include a number of electronic components, and in some examples may be formed of a circuit board such as a PCB that supports and electrically connects the electronic components. The sensor 154 (switch) may be one of these electronic components positioned on the circuit board. In some examples, the sensor may comprise its own circuit board or other base element to which it can be attached. In some examples, a flexible circuit board may be utilized. A flexible circuit board may be configured into a variety of shapes. In some examples, a flexible circuit board may be combined with, layered onto, or form part or all of a heater substrate.

In some examples, the reservoir 174 may be a container for storing the aerosol-generating material 164. In some examples, the reservoir may be or include a fibrous reservoir with a substrate with the aerosol-generating material present on or in a support. For example, the reservoir can comprise one or more layers of nonwoven fibers substantially formed into the shape of a tube encircling the interior of the housing 172, in this example. The aerosol-generating material may be retained in the reservoir. Liquid components, for example, may be absorptively retained by the reservoir. The reservoir may be in fluid connection with the aerosol-generating material transfer component 176. The aerosol-generating material transfer component may transport the aerosol-generating material stored in the reservoir via capillary action—or via a micro pump—to the electric heater 144. As such, the electric heater is in a heating arrangement with the aerosol-generating material transfer component.

In use, when a user draws on the aerosol provision system 140, airflow is detected by the sensor 154, and the electric heater 144 is activated to energize the aerosol-generating material 164 to generate an aerosol. Drawing upon the mouth end of the aerosol provision system causes ambient air to enter and pass through the aerosol provision system. In the consumable 142, the drawn air combines with the aerosol that is whisked, aspirated or otherwise drawn away from the electric heater and out the opening 178 in the mouth end of the aerosol provision system.

Figure 1D:
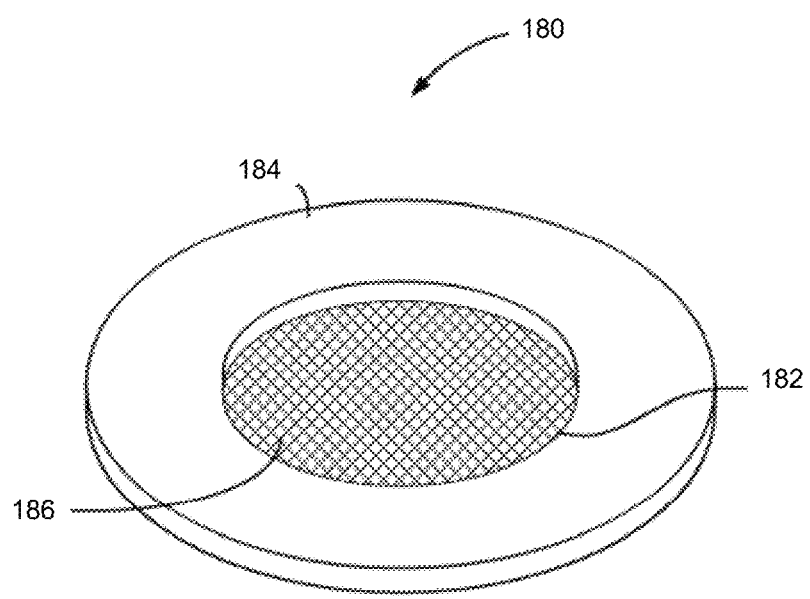
FIG. 1D illustrates a nebulizer that may be used to implement an aerosol generator of an aerosol provision system, according to some example implementations.

Again, as shown in FIGS. 1B and 1C, the aerosol generator of the aerosol provision system 140 is an electric heater 144 designed to heat the aerosol-generating material 164 to generate an aerosol. In other implementations, the aerosol generator is designed to break up the aerosol-generating material without heating, or with only secondary heating. FIG. 1D illustrates a nebulizer 180 that may be used to implement the aerosol generator of an aerosol provision system, according to some these other example implementations.

As shown in FIG. 1D, the nebulizer 180 includes a mesh plate 182 and a piezo material 184 that may be affixed to one another. The piezo material may be driven to vibrate and cause the mesh plate to break up aerosol-generating material into an aerosol. In some examples, the nebulizer may also include a supporting component located on a side of the mesh plate opposite the piezo material to increase the longevity of the mesh plate, and/or an auxiliary component between the mesh plate and the piezo material to facilitate interfacial contact between the mesh plate and the piezo material.

In various example implementations, the mesh plate 182 may have a variety of different configurations. The mesh plate may have a flat profile, a domed shape (concave or convex with respect to the aerosol-generating material), or a flat portion and a domed portion. The mesh plate defines a plurality of perforations 186 that may be substantially uniform or vary in size across a perforated portion of the mesh plate. The perforations may be circular openings or non-circular openings (e.g., oval, rectangular, triangular, regular polygon, irregular polygon). In three-dimensions, the perforations may have a fixed cross section such as in the case of cylindrical perforations with a fixed circular cross section, or a variable cross section such as in the case of truncated cone perforations with a variable circular cross section. In other implementations, the perforations may be tetragonal or pyramidal.

The piezo material 184 may be or include a piezoelectric material or a piezomagnetic material. A piezoelectric material may be coupled to circuitry configured to produce an oscillating electric signal to drive the piezoelectric material to vibrate. For a piezomagnetic material, the circuitry may produce a pair of antiphase, oscillating electric signals to drive a pair of magnets to produce antiphase, oscillating magnetic fields that drives the piezomagnetic material to vibrate.

The piezo material 184 may be affixed to the mesh plate 182, and vibration of the piezo material may in turn cause the mesh plate to vibrate. The mesh plate may be in contact with or immersed in aerosol-generating material, in sufficient proximity of aerosol-generating material, or may otherwise receive aerosol-generating material via an aerosol-generating material transfer component. The vibration of the mesh plate, then, may cause the aerosol-generating material to pass through the perforations 186 that break up the aerosol-generating material into an aerosol. More particularly, in some examples, aerosol-generating material may be driven through the perforations 186 in the vibrating mesh plate 182 resulting in aerosol particles. In other examples in which the mesh plate is in contact with or immersed in aerosol-generating material, the vibrating mesh plate may create ultrasonic waves within aerosol-generating material that cause formation of an aerosol at the surface of the aerosol-generating material.

As described above, hybrid products use a combination of aerosol-generating materials, and some hybrid products are similar to vapor products except that the aerosol generated from one aerosol-generating material may pass through a second aerosol-generating material to pick up additional constituents. Another similar aerosol provision system in the form of a hybrid product may therefore be constructed similar to the vapor product in FIGS. 1B and 1C (with an electric heater 144 or a nebulizer 180). The hybrid product may include a second aerosol-generating material through which aerosol from the aerosol-generating material 164 is passed to pick up additional constituents before passing through the opening 178 in the mouth end of the aerosol provision system.

Figure 2A:
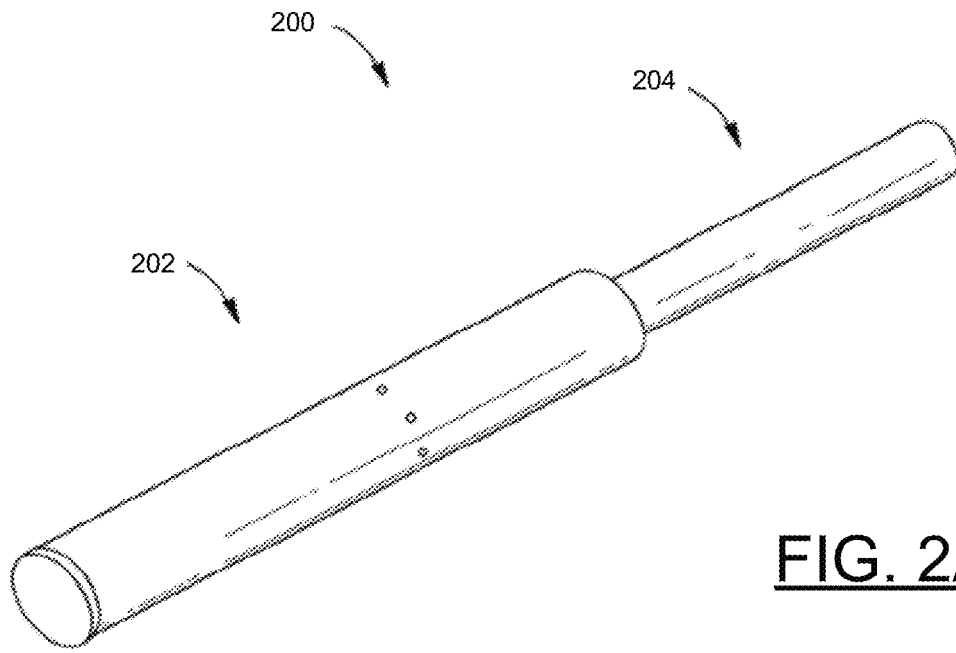
FIGS. 2A, 2B and 2C illustrate an aerosol provision system in the form of a heat-not-burn product, according to some example implementations.
Figure 2B:
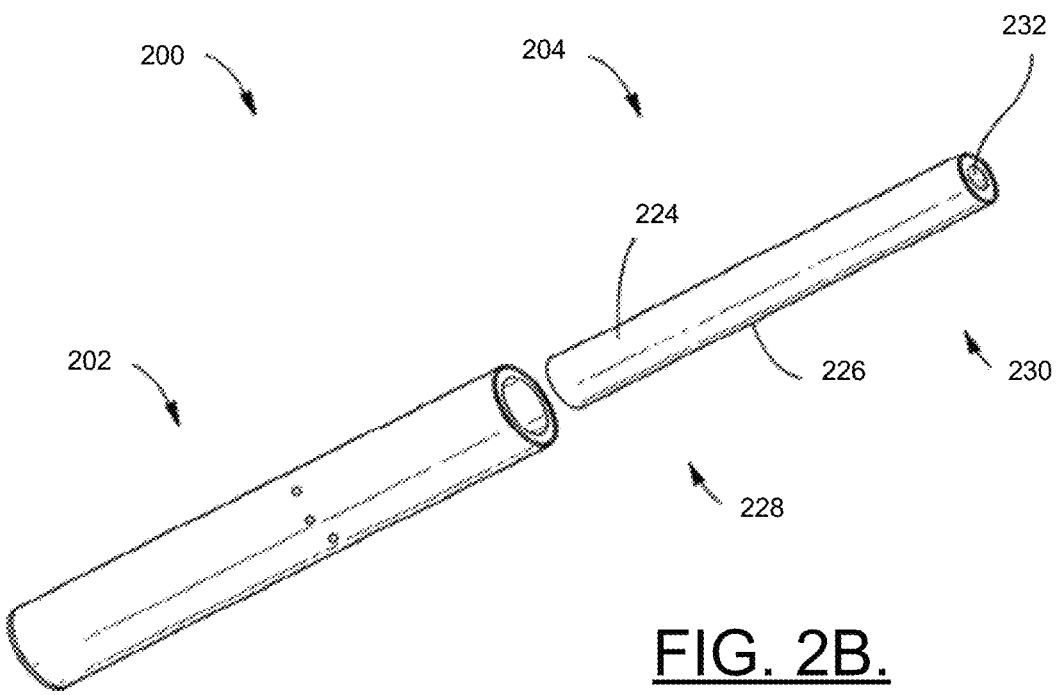
Figure 2C:
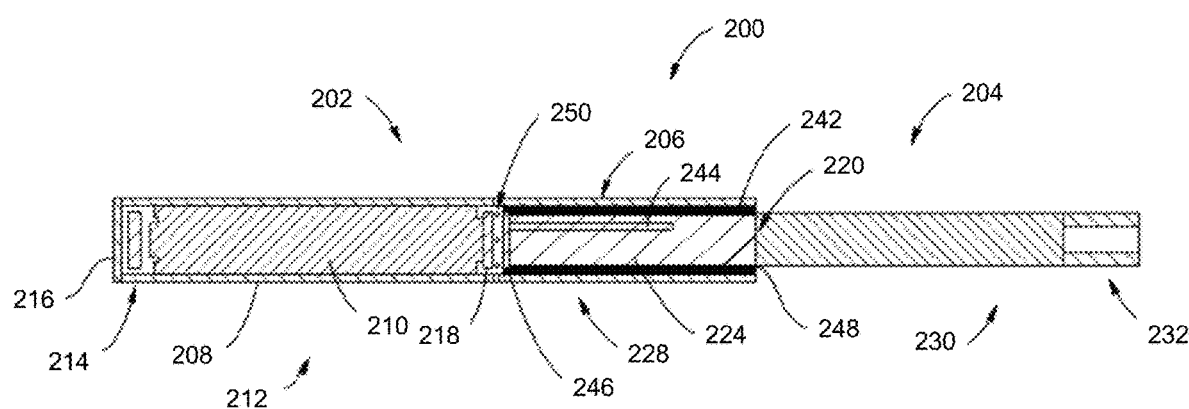

FIGS. 2A, 2B and 2C illustrate an aerosol provision system 200 in the form of a heat-not-burn product, and that in some example implementations may correspond to the aerosol provision system 100. As shown, the aerosol provision system may include an aerosol provision device 202 (also referred to as a control body or power unit) and a consumable 204 (also referred to as an aerosol source member or cartridge), which may correspond to respectively the aerosol provision device 102 and the consumable 104. The aerosol provision system and in particular the aerosol provision device may also include an aerosol generator corresponding to the aerosol generator 106, and in the form of an electric heater 206. The aerosol provision device and the consumable can be permanently or detachably aligned in a functioning relationship. FIG. 2A illustrates the aerosol provision system in a coupled configuration, whereas FIG. 2B illustrates the aerosol provision system in a decoupled configuration. FIG. 2C illustrates a partially cut-away side view of the aerosol provision system in the coupled configuration.

As seen in FIGS. 2A, 2B and 2C, the aerosol provision device 202 and consumable 204 each include a number of respective components. The components illustrated in the figures are representative of the components that may be present in an aerosol provision device and consumable and are not intended to limit the scope of components that are encompassed by the present disclosure.

The aerosol provision device 202 may include a housing 208 (sometimes referred to as an aerosol provision device shell) that may include a power source 210. The housing may also include circuitry 212 with a switch in the form of a sensor 214, a user interface including a light source 216 that may be illuminated with use of the aerosol provision system 200, and processing circuitry 218 (also referred to as a control component). In some examples, at least some of the electronic components of the circuitry may be formed of a circuit board or a flexible circuit board that supports and electrically connects the electronic components.

The housing 208 may also include a receptacle in the form of a consumable receiving chamber 220 structured to engage and hold the consumable 204. The consumable 204 may include an aerosol-generating material 224 that may correspond to aerosol-generating material 124, and that may include one or more of each of a number of constituents such as an active substance, flavorant, aerosol-former material or other functional material. And the aerosol-generating material may be present on or in a support to form a substrate 226.

In the coupled configuration of the aerosol provision system 200, the consumable 204 may be held in the receiving chamber 220 in varying degrees. In some examples, less than half or approximately half of the consumable may be held in the receiving chamber 220. In other examples, more than half of the consumable 204 may be held in the receiving chamber 220. In yet other examples, substantially the entire consumable 204 may be held in the receiving chamber 220.

As shown in FIGS. 2B and 2C, in various implementations of the present disclosure, the consumable 204 may include a heated end 228 sized and shaped for insertion into the aerosol provision device 202, and a mouth end 230 upon which a user draws to create the aerosol. In various implementations, at least a portion of the heated end may include the aerosol-generating material 224.

In some example implementations, the mouth end 230 of the consumable 204 may include a filter 232 made of a material such as cellulose acetate or polypropylene. The filter may additionally or alternatively contain strands of tobacco containing material. In some examples, at least a portion of the consumable may be wrapped in an exterior overwrap material, which may be formed of any material useful to provide additional structure, support and/or thermal resistance. In some examples, an excess length of the overwrap at the mouth end of the consumable may function to simply separate the aerosol-generating material 224 from the mouth of a user or to provide space for positioning of a filter material, or to affect draw on the consumable or to affect flow characteristics of the aerosol leaving the consumable during draw.

The electric heater 206 may perform electric heating of the aerosol-generating material 224 by resistance (Joule) heating, induction heating, dielectric and microwave heating, radiant heating, arc heating and the like. The electric heater may have a variety of different configurations. In some examples, at least a portion of the electric heater may surround or at least partially surround at least a portion of the consumable 204 including the aerosol-generating material when inserted in the aerosol provision device 202. In other examples, at least a portion of the electric heater may penetrate the consumable when the consumable is inserted into the aerosol provision device. In some examples, the substrate 226 material may include a susceptor, which may be embedded within the aerosol-generating material, or on one or either side of the aerosol-generating material.

Although shown as a part of the aerosol provision device 202, the electric heater 206 may instead be a part of the consumable 504. In some examples, the electric heater or a part of the electric heater may be may be combined, packaged or integral with (e.g., embedded within) the aerosol-generating material 224.

As shown, in some examples, the electric heater 206 may extend proximate an engagement end of the housing 208, and may be configured to substantially surround a portion of the heated end 228 of the consumable 204 that includes the aerosol-generating material 224. The electric heater 206 may be or may include an outer cylinder 242, and one or more resistive heating elements 244 such as prongs surrounded by the outer cylinder to create the receiving chamber 220, which may extend from a receiving base 246 of the aerosol provision device to an opening 248 of the housing 208 of the aerosol provision device. In some examples, the outer cylinder may be a double-walled vacuum tube constructed of stainless steel so as to maintain heat generated by the resistive heating element(s) within the outer cylinder, and more particularly, maintain heat generated by the resistive heating element(s) within the aerosol-generating material.

Like the electric heater 206, the resistive heating element(s) 244 may have a variety of different configurations, and vary in number from one resistive heating element to a plurality of resistive heating elements. As shown, the resistive heating element(s) may extend from a receiving base 246 of the aerosol provision device 202. In some examples, the resistive heating element(s) may be located at or around an approximate radial center of the heated end 228 of the consumable 204 when inserted into the aerosol provision device. In some examples, the resistive heating element(s) may penetrate into the heated end of the consumable and in direct contact with the aerosol-generating material. In other examples, the resistive heating element(s) may be located inside (but out of direct contact with) a cavity defined by an inner surface of the heated end of the consumable.

In some examples, the resistive heating element(s) 244 of the electric heater 206 may be connected in an electrical circuit that includes the power source 210 such that electric current produced by the power source may pass through the resistive heating element(s). The passage of the electric current through the resistive heating element(s) may in turn cause the resistive heating element(s) to produce heat through resistance (Joule) heating.

In other examples, the electric heater 206 including the outer cylinder 242 and the resistive heating element(s) 244 may be configured to perform induction heating in which the outer cylinder may be connected in an electrical circuit that includes the power source 210, and the resistive heating element(s) may be connected in another electrical circuit. In this configuration, the outer cylinder and resistive heating element(s) may function as a transformer in which the outer cylinder is an induction transmitter, and the resistive heating element(s) is/are an induction receiver. In some of these examples, the outer cylinder and the resistive heating element(s) may be parts of the aerosol provision device 202. In other of these examples, the outer cylinder may be a part of the aerosol provision device, and the resistive heating element(s) may be a part of the consumable 204.

The outer cylinder 242 may be provided with an alternating current directly from the power source 210, or indirectly from the power source in which an inverter (as part of the circuitry 212) is configured to convert direct current from the power source to an alternating current. The alternating current drives the outer cylinder to generate an oscillating magnetic field, which induces eddy currents in the resistive heating element(s) 244. The eddy currents in turn cause the resistive heating element(s) to generate heat through resistance (Joule) heating. In these examples, the resistive heating element(s) may be wirelessly heated to form an aerosol from the aerosol-generating material 224 positioned in proximity to the resistive heating element(s).

In various example implementations, the aerosol provision device 202 may include an air intake 250 (e.g., one or more openings or apertures) in the housing 208 (and perhaps also the receiving base 246) to enable airflow into the receiving chamber 220. When a user draws on the mouth end 228 of the consumable 204, the airflow may be drawn through the air intake into the receiving chamber, pass into the consumable, and be drawn through the aerosol-generating material 224. The airflow may be detected by the sensor 214, and the electric heater 206 may be activated to energize the aerosol-generating material to generate an aerosol. The airflow may combine with the aerosol that is whisked, aspirated or otherwise drawn out an opening at the mouth end of the aerosol provision system. In examples including the filter 232, the airflow combined with the aerosol may be drawn out an opening of the filter at the mouth end.

Figure 3:
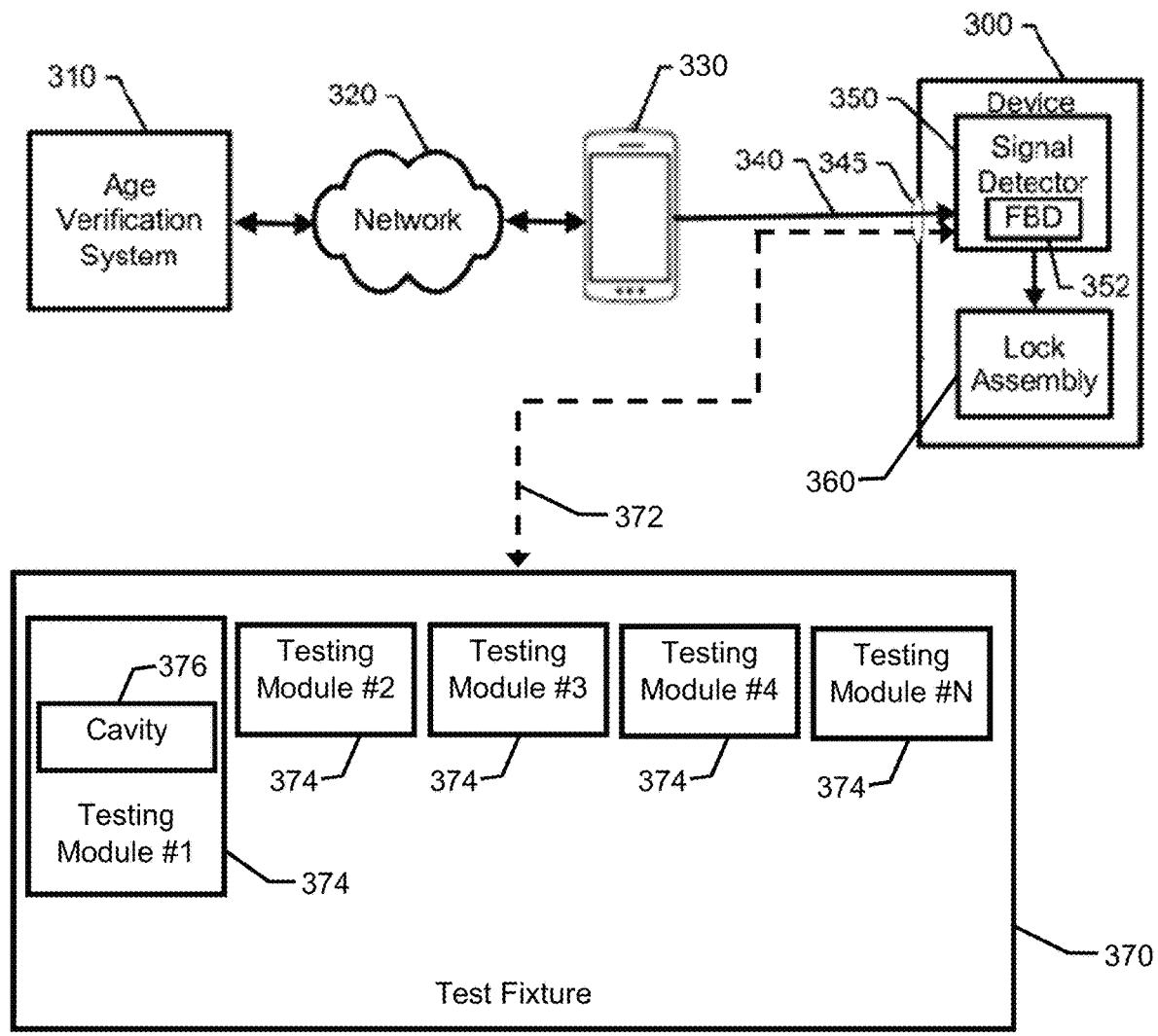
FIG. 3 is a block diagram of an example implementation of devices associated with a PSA process in accordance with an example embodiment.

As noted above, PSA may be desirable after purchase or acquisition of the aerosol provision devices 102/202 of FIGS. 1 and 2, or other devices like them. FIG. 3 illustrates an example system diagram for functional control of a device 300 (which may be an example of the aerosol provision devices 102/202 of FIGS. 1 and 2) for PSA in accordance with an example embodiment. In this regard, FIG. 3 illustrates how the device 300 communicates with an age verification system 310 through a network 320 and a host device 330, in order to verify the user's age, which may also be used to authenticate the device 300 periodically. The device 300 may be in a locked state (e.g., in which the device 300 is unusable or such usage is strictly controlled) until authenticated properly via the PSA process. After authentication, the device 300 may be unlocked and operate normally. The age verification system 310 may be operably coupled with the host device 330 over the network 320. Although not shown, the age verification system 310 may be coupled with the device 300 over the network 320.

The device 300 may be any aerosol delivery device, including for example an electronic nicotine delivery systems ("ENDS") device according to various embodiments described above. In one embodiment, the age verification system 310 may not only verify an age (e.g. for an age restricted product), but may also provide authentication or user identification (e.g. for an actual purchase or to prevent theft). An example of the authentication and age verification by the age verification system 310 is further described in U.S. Pat. App. Pub. No. 2020/0315259, entitled "AUTHENTICATION AND AGE VERIFICATION FOR AN AEROSOL DELIVERY DEVICE," which claims priority to U.S. Provisional App. No. 62/282,222 on Apr. 2, 2019, the entire disclosures of each of which are hereby incorporated by reference. The authentication described below may rely on age verification being performed first and then referenced for subsequent authentication using a control signal 340 sent to the device 300. However, there may be other verification mechanisms other than age. For example, in some embodiments, user identification may be performed in lieu of age verification. Thus, for example, the age verification system 310 is more generally simply an example of an authorization system that is configured to conduct PSA for the device 300, and the age verification system 310 may therefore more generally be referred to as an authentication agent. Cartridges or consumables may be registered as part of the age verification or authentication process as described in U.S. Pat. App. Pub. No. 2020/0359703, entitled "AGE VERIFICATION WITH REGISTERED CARTRIDGES FOR AN AEROSOL DELIVERY DEVICE," filed on May 17, 2019, the entire disclosure of which is herein incorporated by reference. U.S. Pat. No. 8,689,804 to Fernando et al. discloses identification systems for smoking devices, the disclosure of which is being incorporated herein by reference.

The age verification system 310 may include a database that tracks users along with ages, as well as maintains a record of the devices and components (e.g. cartridges) along with approvals. It may be encrypted and/or use anonymous identifiers (e.g. numbers, letters, or any alphanumeric identifiers) for each user.

The initial age verification may occur and be stored in the database, such as may be maintained at the age verification system 310 and/or otherwise accessible over the network 320. In some embodiments, age verification records may be maintained using blockchain technology. Future age verification requests by that user may be confirmed by calling the database. Specifically, once a user is initially age verified as confirmed in the age verification system database, future verifications (i.e. "authentications") may be merely calls to this database for unlocking the device 300. In other words, a user initially performs an age verification and then subsequent usage may require authentication without the complete initial age verification requirements. The frequency with which the device 300 must be unlocked or authenticated can vary. Likewise, the timing for when a user needs to re-verify their age (or otherwise re-authenticate themselves) may vary. For example, each time the cartridge is replaced, the user may need to re-verify or re-authenticate. In some embodiments, the re-authentication may be required after a certain number of puffs from the device 300 or may be based on the passage of time (e.g. once per hour, day, week, month, etc.). The online database may track the requests for authentication and set limits per user. This can prevent the potential fraud of a single user unlocking other under-age user's devices. This also would prevent the re-distribution of unlocked (i.e. verified and authenticated) devices and/or accessories. Reasonable limits for the number of devices, chargers, consumables, and/or authentications can prevent this potential fraud.

A user profile may be stored (e.g. on the device 300 or from an application or app on a host device 330) that includes an age verified identity for the user. An app on the host device 330 may access the user profile over a network, such as the network 320. Once a user is initially age verified as confirmed in the age verification system database, the user profile for that user may be generated and saved so that future verifications (i.e. "authentications") may be merely calls to this database. In one embodiment, the age verification may be a prerequisite for the host device 330 to be able to generate and submit the control signal 340 to the device 300.

The host device 330 may be any computing or communication device, such as a smartphone, tablet, cellular phone, analog phone, computer, or dedicated authentication device at a point of sale. The host device 330 may communicate with or provide the control signal 340 to the device 300 for authentication or activation. The control signal 340 from the host device 320 to the device 300 may be a wired or a wireless signal such as, for example an RF signal, a vibratory signal, an audio signal or a light/optical signal. Optical signals should be understood to include those in the visible light spectrum, but also infra-red signals, fiber optic signals, ultraviolet light signals as well as signals associated with intensity tuning or wavelength tuning. Audible signals should be understood to include those in and outside the audible range for humans. Moreover, audible signals that employ decibel tuning or frequency tuning may also be included. In some embodiments, the host device 330 may therefore couple audibly or optically with the device 300 in order to communicate the control signal 340 to authenticate and/or unlock the device 300. Thus, the ability of the host device 330 with respect to transmission of the control signal 340, and the environmental factors that may impact receipt of the control signal 340 at the device 300 are all important to successful authentication or authorization of the device 300.

Particularly for examples in which the control signal 340 is an optical signal or audio signal, the device 300 may include an aperture 345 formed in a housing of the device 300. The aperture 345 may in turn provide access for the audio or optical signal that is an example of the control signal 340 to reach a signal detector 350. The signal detector 350 may interface with a lock assembly 360 to alternately lock or unlock the device 300 as described herein. In some cases, the signal detector 350 may further include a feedback device (FBD) 352 that is configured to provide visual, haptic and/or audible feedback to the user relating to the success or failure of attempts to unlock the device 300 (or other status information). In some cases, the feedback device 352 may include, vibrating components, lights (e.g., one or more light emitting diodes (LEDs)) or speakers that provide an output responsive to successful or failed efforts to operate the lock assembly 360. In an example embodiment, a different color or sequence of lights, or a different sound or tonal pattern may indicate success and failure or even other status information.

In an example embodiment, the signal detector 350 may be configured to process the control signal 340 to utilize or extract an unlock code therein for PSA. Thus, in a context in which the control signal 340 is an optical signal, audio signal, an RF signal or a vibratory signal, it should be appreciated that the signal detector 350 is configured to process the control signal 340 to determine the unlock code for provision to the lock assembly 360 to unlock the lock assembly 360 using the unlock code.

The lock assembly 360 may be configured to prevent operation of the device 300 for generating an aerosol when the device 300 is in a locked state, and enable operation of the device 300 for generating the aerosol when the device 300 is in an unlocked state. For example, when in the locked state, the lock assembly 360 may be configured to prevent operation of the aerosol generator 106 of FIG. 1 with respect to generating the aerosol, and may be configured to enable operation of the aerosol generator 106 for generating the aerosol in the unlocked state. The lock assembly 360 may be the last step in the PSA process (or one of the last steps), and may apply the unlock code (or unique code) provided in the control signal 340 to transition from the locked state to the unlocked state if the unlock code is authenticated. As such, the signal detector 350 may receive the control signal 340 and process the control signal 340 using appropriate techniques to obtain the unlock code from the control signal 340 and provide the unlock code to the lock assembly 360. If authenticated, the lock assembly 360 may enable the device 300 to be shifted to the unlocked state to enable aerosol generation, thereby successfully completing the PSA process.

As noted above, the control signal 340 may be a wireless signal that may be, for example, optical or audible. General information regarding processing the control signal 340 as an optical signal is provided in U.S. Pat. App. Pub. No. 2020/0315261, entitled "FUNCTIONAL CONTROL AND AGE VERIFICATION OF ELECTRONIC DEVICES THROUGH VISUAL COMMUNICATION," filed on Jun. 14, 2019, the entire disclosure of which is herein incorporated by reference. Similarly, information regarding processing the control signal 340 as an audible signal is provided in U.S. Pat. App. Pub. No. 2020/0315260, entitled "FUNCTIONAL CONTROL AND AGE VERIFICATION OF ELECTRONIC DEVICES THROUGH SPEAKER COMMUNICATION," filed on Jun. 14, 2019, the entire disclosure of which is herein incorporated by reference. The signal detector 350 may be configured to provide processing for the control signal 340 in either context.

To the extent a user obtains the device 300 and attempts to perform PSA in the manner generally described above, but the attempted PSA fails due to limitations of the host device 330 or various technical or environmental factors, the user may become irritated or annoyed. Meanwhile, if the PSA attempt proceeds smoothly for the user, the likelihood of user satisfaction, positive reviews, and continued sales of such devices may be increased. Thus, to provide a higher likelihood of a positive user experience associated with PSA, example embodiments may provide the ability to ensure that the device 300 is fully equipped to operate as intended to perform PSA by ensuring that each of the signal detector 350 and the lock assembly 360 are functionally tested to operate properly as described in greater detail below.

In an example embodiment, a test fixture 370 may be operably coupled to the device 300 to test the device 300 functionally before the device 300 is sold or distributed in order to provide this ability. In this regard, for example, the test fixture 370 may be configured to interface with the signal detector 350 to provide test signaling 372. The test signaling 372 may pass through the aperture 345 formed in a housing of the device 300, and otherwise cause the signal detector 350 to operate as described above to operate the lock assembly 360 to transition to the unlocked state, and then transition back into the locked state. As such, the test fixture 370 may be configured to cycle the device 300 through the unlocked and locked states to confirm that the device 300 operates properly for PSA. The test fixture 370 may also confirm other information about the device 300 (e.g., a unique identifier or unique ID of the device 300) in preparation for enabling the device 300 to be sold or otherwise distributed and then unlocked by the user who purchases the device 300.

As noted above, changes may be made to the device 300 over time. For example, the device 300 may be upgraded to include additional functional capabilities with improved models. In some cases, entirely new devices may be designed, but the new devices may share similarities to the device 300 in terms of form factor, function or the like. In other cases, software improvements, upgrades, or replacement may occur on the device 300. In each of these cases (and likely also in others), the specific structure of the control signal 340 may change. If the control signal 340 changes, then the corresponding signals of the test signaling 372 must also be changed. This may require an entirely new test fixture 370, or at least a wholesale change to the software and perhaps some hardware associated with the test fixture 370. Such changes would result in each change to the device 300 causing a corresponding need for a redesign of the test fixture 370, which would lead to significant cost and complexity.

One option for attempting to avoid the costly issue described above may be to make the signaling components associated with unlocking functions modular in either or both of the device 300 and the test fixture 370. However, example embodiments aim to provide yet further flexibility by making the test signaling 372 itself conform to an adaptive structure. By building adaptability into the signaling architecture, significant flexibility can be provided for extended utility of the test fixture 370.

Figure 4:
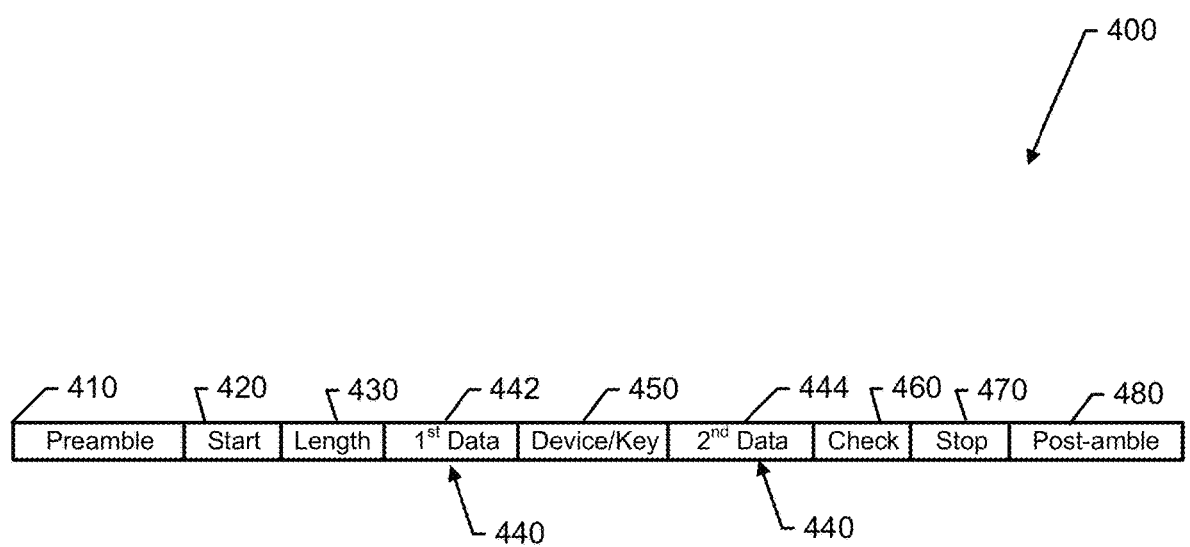
FIG. 4 is a schematic diagram of a signal or message format in accordance with an example embodiment.

FIG. 4 illustrates a signal architecture for the test signaling 372 of an example embodiment. In this regard, a signal format 400 for the test signaling 372 may include a preamble 410, a start indicator 420, a length indicator 430, and a data portion 440, which in this example is split into a first data portion 442 and a second data portion 444. A device/key field 450 is, in this example, disposed between the first and second data portions 442 and 444. The signal format 400 may also include a check portion 460, a stop indicator 470 and a post-amble 480. The preamble 410, start indicator 420, length indicator 430, data portion 440, device/key field 450, check portion 460, stop indicator 470 and post-amble 480 may each be modified to suit the purposes of the testing signal 372 for any particular instance of the device 300. However, as will be discussed in greater detail below, the length indicator 430 may, in some cases, be particularly useful in connection with providing flexibility for changing the functional capabilities of the testing signaling 372 without changing the signal format 400.

Notably, however, it may be possible to generally modify other portions of the signal format 400. For example, the components listed above could be modified to include additional or fewer portions, or each portion may itself be modified. In some embodiments, regardless of which other portions are included, the length indicator 430 may be the portion that is modified to change various capabilities and methodologies for the operation of the test signaling 372 to accommodate different instances of the device 300 (and therefore modifications and future designs of the device 300 as such modifications occur and such design changes are implemented). As such, the length indicator 430 may play a significant role in "future proofing" the test signaling 372.

In this regard, for example, various changes may be made to the functional capabilities or operations of the device 300, but the test fixture 370 may not need to be modified in order to continue using the test fixture 370 to test the updated or new instance of the device 300. Instead, the test signaling 372 may be modified in that one or more portions of the signal format 400 described above may be changed to accommodate the new design of the device 300. In order to orient the test fixture 370 to be able to implement the modifications to the test signaling 372, the signal format 400 may be modified at one or more portions thereof. This modification may, without some mechanism by which to decipher the changes made, not be comprehensible to the test fixture 370. However, the length indicator 430 may provide various types of information, and signaling to provide the key information to enable the test fixture 370 to interact with the updated or new instance of the device 300 by employing the corresponding new or updated version of the signal format 400 as indicated by the length indicator 430.

The length indicator 430 may have a general function of indicating the anticipated length of the data transmission that will be provided in the data portion 440. However, before discussing the length indicator 430 in greater detail, it may be helpful to discuss the other portions of the signal format 400 to provide context information for better understanding of the impact that changes to the length indicator 430 may provide. In this regard, the preamble 410 may generally be used to establish a known starting condition. The start indicator 420 may be a predefined bit sequence or other signaling portion that may indicate the start of a valid data transmission. The start indicator 420 may include a unit of time or a unit of length, and may include distinguishable transitions that form a pattern (e.g., 4-1-1-4) that is recognizable as the start indicator 420.

The data portion 440, as noted above, may be split into two portions in some cases. The first data portion 442 and the second data portion 444 may each include data that is transmitted to make a determination if the appropriate action can take place. The entirety of the data provided in the first data portion 442 and the second data portion 444 may be divisible by two, and may be split into two halves to be transmitted in the correct order. The data transmitted may be broken into a binary format, and all bits thereof may be transmitted, including the upper significant bits consisting of zeros. In an example embodiment, most significant bits may all be included in the first data portion 442, and the least significant bits may all be included in the second data portion 444. This structure may further complicate efforts to hack the signal format 400. The data portion 440 may include the unique unlock code that is determined based on the unique identifier of the device 300.

As noted above, in some cases, the device/key field 450 may be inserted between the first and second data portions 442 and 444 of the data portion 440. However, it is also possible to place the device/key field 450 after the data portion 440. Each product (i.e., each instance of the device 300) may have a device identifier that is applicable to the product. The device identifier may in turn correspond to a plurality of unique identifiers (i.e., the unique identifier described above) that form a pool of applicable unique identifiers for the device identifier. As noted above, each individual product (or separate instance of an individual device 300) has its own unique identifier, and the unique identifier of each device may be stored in permanent or non-volatile memory on the respective device. The unique identifier of some embodiments may follow a specific structure, but the individual numbers assigned to any given device may be randomly generated and therefore not incremental.

As one example, the unique identifier may have six characters, and five of the characters may provide a binary code. A five bit binary code allows thirty-two unique codes to be defined. The five bit binary code may then be preceded (and/or followed) by another character (or characters). For a six bit code, the preceding character may be one of thirty-two different character options that may be defined to eliminate characters that may be confused for each other (e.g., the letter "O", which could be confused with the number 0, the letter "I", which could be confused with the number 1, and the letter "B", which could be confused with the number 8. Thus, for example, a thirty-two character set of preceding characters may include numbers 1 to 9, and all the letters of the alphabet not excluded above. However, other paradigms for generating the unique identifier are also possible. For example, different characters could be used or substituted for respective different product lines. In any case, the unique identifiers may be filtered to prevent any inappropriate words, phrases, number sequences, or slang from appearing in the sequences as well.

Each product may also have a unique set of valid keys to use for unlocking devices with a respective unique identifier, or belonging to a device identifier including a batch of respective unique identifiers. The device/key field 450 may provide information identifying the device identifier (with corresponding respective unique identifiers associated therewith) and key number or other key identification information of the valid keys (i.e., not the valid keys themselves). However, such keys, and key identification information, may not be used for all devices 300.

The device/key field 450 may therefore, in some cases, include a device portion and a key portion. The device portion of some examples may be a ten bit field that uniquely identifies each product (or device 300) with the device identifier. In order to ensure that each different type or model of the device 300 is distinguishable from each other type or model of the device 300, and to allow the unique identifiers to be reusable (e.g., individually or in pools), the device identifier associated with the number or code in the ten bit field may provide a convenient tool for use in the signal format 400. Each device identifier may have a corresponding code (e.g., a QR code or quick response code) or a short message service (SMS) number that is used to point to the corresponding batch of unique identifiers that are associated with a given product (or device 300). The device identifier could therefore be any number or sequence of numbers that is associated with the ten bit code or number inserted in the ten bit field in association with each instance of the device identifier. When the test signaling 372 is received from the test fixture 370 for the device 300, the device identifier that corresponds to the ten bit code or number of the device portion of the device/key field 450 must match the device identifier of the device 300 itself. Thus, not only are the contents of the device/key field 450 clearly useful in enabling the proper functioning of the test fixture 370, but the flexibility provided by the signal format 400 via the length indicator 430 (as discussed herein) is also helpful in ensuring that as new device types are developed, the test fixture 370 can be used to interface with the new device types with minimal modification (or none) to the hardware of the test fixture 370. Instead, only software or even merely signal modifications (i.e., changes to the contents of the signal format 400) may be needed in many cases.

The key identification information may be provided in a key number field that may form or be part of the key portion of the device/key field 450. In some examples, the key number field may be a four bit field that includes a value or number that identifies a security key stored in the device 300. The security key may be used to decrypt all or a portion of the contents of the signal format 400 (e.g., the data portion 440). With a four bit field, up to sixteen different keys can be stored. In some embodiments, all sixteen different keys may be stored, but only a selected one (i.e., the one identified in the device/key field 450) may be able to decrypt the unique unlock code that is included in the data portion 440.

The test signaling 372 may therefore provide an identification of one of the sixteen possible keys via the value or number providing the security key in the key number field. If the security key is a valid key for the device 300, the data portion 440 of the signal format 400 (or the entirety thereof) may be decrypted successfully during operation of the test fixture 370.

The check portion 460 may employ a cyclic redundancy check (CRC) on the data portion 440. The CRC or other data check may provide confirmation that the data of the data portion 440 was received properly. In some examples, the check portion 460 may include an 8 bit CRC, but other CRC checks could alternatively be employed. In fact, the check portion 460 may, in some cases, include a call to a selected checking algorithm or instruction. For example, "CRC-8" may indicate that the 8 bit CRC check should be employed, but other specific indicators and checks may alternatively be used. When an 8 bit CRC check is employed, the total number of bits in the fields being checked may be a multiple of eight (or may be filled out with sufficient "zeros" to achieve a multiple of eight.

The stop indicator 470 may be another defined signal portion that may indicate the end of valid data transmission. The stop indicator 470 may also be a predefined bit sequence or other signaling portion that may indicate the end of a valid data transmission. The stop indicator 470 may therefore also include a unit of time or a unit of length, and may include distinguishable transitions that form a pattern (e.g., 3-2-2-3) that is recognizable as the stop indicator 470. The postamble 480 may establish a known completion condition.

In an example embodiment, different levels of security may be used for securing the test signaling 372. For example, options such as no encryption, 32-bit encryption, 64-bit encryption, 128-bit encryption, or 256-bit encryption may be distinct levels of encryption that may each be possible selections for employment. The level of encryption that is to be used may vary from product to product and, the security level used to create the test signaling 372 must generally match the security level defined for a given product (or instance of the device 300). Thus, the test signaling 372 (and therefore the signal format 400) may define the level of encryption to match that which applies to the device 300. In an example embodiment, the length indicator 430 may be used to indicate the level of encryption. By providing information identifying the level of encryption that is to be used within the length indicator 430 (and therefore before the data portion 440), not only can the correct level of encryption be identified and selected for use at the device 300, but there is flexibility to use the signal format 400 for numerous devices with different levels of encryption. Thus, any of the five levels of encryption that have been identified above could be used, and any future levels of encryption that may be developed can also be substituted successfully without any other changes needed beyond changing the corresponding bit or segment of the length indicator 430 that is used to indicate the level of encryption.

In addition (or as an alternative) to identifying the level of encryption, the type of encryption may also be identified. In this regard, for example, different types of encryption such as the Message Digest Algorithm family (MD5), Advanced Encryption Standard (AES), Data Encryption Standard (DES), Rivest-Shamir-Adleman (RSA) and/or the like may be correlated with respective different bits or segments of the length indicator 430. Bit and/or segment location and/or values may therefore indicate the specific type of encryption that is designated for use by the device 300. A lookup table may be employed to correlate the respective different types of encryption with bits or segments in the length indicator 430.

The length indicator 430 is therefore strategically used, due to its position in the signal format 400 to create significant flexibility to the definition of the signal format 400 to enable usage with many different instances of the device 300 without changing anything at the test fixture 370 beyond information included in the test signaling 372 (and specifically the length indicator 430). This flexibility may include defining the level of encryption, as noted above, but may not be limited to just one area. Indeed, the length indicator 430 may be used to provide further flexibility in relation to defining whether a device identifier is present, or indicating information identifying the device identifier itself, or identifying how or where to find the device identifier. In some embodiments, the length indicator 430 may also or alternatively be used to indicate the presence of the key identification information in the device/key field 450. Accordingly, whereas the device/key field 450 may always exist within the signal format 400, the existence or non-existence of the key identification information within the device/key field 450 may be indicated by the length indicator 430.

As can be appreciated from the descriptions above, the length indicator 430 may indicate the anticipated length of the data that is to be transmitted in the signal format 400 of the test signaling 372. In some embodiments, the indication of anticipated length may be provided, at least in part, by providing information on the contents of one or more other fields or segments of the signal format 400. Thus, for example, the indication of length may be an accumulation of the indication of contents of the data portion 440 relating to encryption and the device identifier, and of contents of the device/key field 450 relating to the key identification information of keys that are used to unlock (or lock) the device 300. In an example embodiment, the length indicator 430 may include multiple segments (e.g., bits) that are associated with each respective different piece of length information (i.e., encryption related information, device identifier information, and key identification information). These segments or bits may always be included, but the contents may change for different types of devices 300 so that the same general signal format 400 applies to multiple types of devices 300 without modification of any hardware (and often also no modification of software) of the test fixture 370. Instead, only the contents of the signal format 400 need be changed and many different types of devices 300, including new device types, can be supported by the test fixture 370 and it is not necessary to design a new test fixture 370 for each new device type.

In some embodiments, the test signaling 372 (or at least the transition signal generated in accordance with the signal format 400) may be communicated in the form of an optical signal. In some embodiments, the optical signal may utilize a transition to mark the start, and then one frame between transitions may correspond to a binary value of one whereas two frames between transitions may correspond to a binary value of zero. For example, for a smart phone that is capable of delivering 20 frames per second, each frame may last for 50 milliseconds (msec). A binary value of 1001 may consist either of a starting value of black, 50 msec of white, 100 msec of black, 100 msec of white, 50 msec of black and an ending value of white, or a starting value of white, 50 msec of black, 100 msec of white, 100 msec of black, 50 msec of white and an ending value of black. This signaling paradigm may require a known starting condition, for which the preamble 410 and post-amble 480 may suffice. Thus, for the optical signal, the preamble 410 may be defined as 10 frames of black, and the post-amble 480 may be 10 frames of white. Signal creation may therefore start with 10 frames of black (i.e., the preamble 410) followed by the start indicator 420, which may be 4 frames of white, 1 frame of black, 1 frame of white, and 4 frames of black. Next, the length indicator 430 may be provided. If security level one (i.e., 32-bit encryption) is employed and no device identifier and no key identification information are provided, then the length indicator may be 0000. This may be signaled as 2 frames of white, 2 frames of black, 2 frames of white, and 2 frames of black. The first data portion 442 may have a binary value of 1010001100001011, which is signaled as: 1 frame of white, 2 frames of black, 1 frame of white, 2 frames of black, 2 frames of white, 2 frames of black, 1 frame of white, 1 frame of black, 2 frames of white, 2 frames of black, 2 frames of white, 2 frames of black, 1 frame of white, 2 frames of black, 1 frame of white, 1 frame of black. Given the length indicator 430 stipulating that the device identifier is not present, and that the key identification information is not present, no information is added to the signal. The second data portion 444 may be represented by the binary value 1101100011001011, which is signaled as: 1 frame of white, 1 frame of black, 2 frames of white, 1 frame of black, 1 frame of white, 2 frames of black, 2 frames of white, 2 frames of black, 1 frame of white, 1 frame of black, 2 frames of white, 2 frames of black, 1 frame of white, 2 frames of black, 1 frame of white, 1 frame of black. The check indicator 460 may be calculated by combining the first data portion 442, the second data portion 444 along with the device/key 450 field. Adding these together results in 32-bits, therefore being a number bounded by being divisible by 8, so no additional bits are needed. Applying CRC-8 to the 32-bit field results in a binary number of 00001010, which may be signaled as which is signaled as: 2 frames of white, 2 frames of black, 2 frames of white, 2 frames of black, 1 frame of white, 2 frames of black, 1 frame of white, 2 frames of black. The stop indicator 470 may then be signaled as 4 frames of white, 1 frame of black, 1 frame of white, 4 frames of black. The signal creation may then conclude with the post-amble 480 of 10 frames of white.

Figure 5:
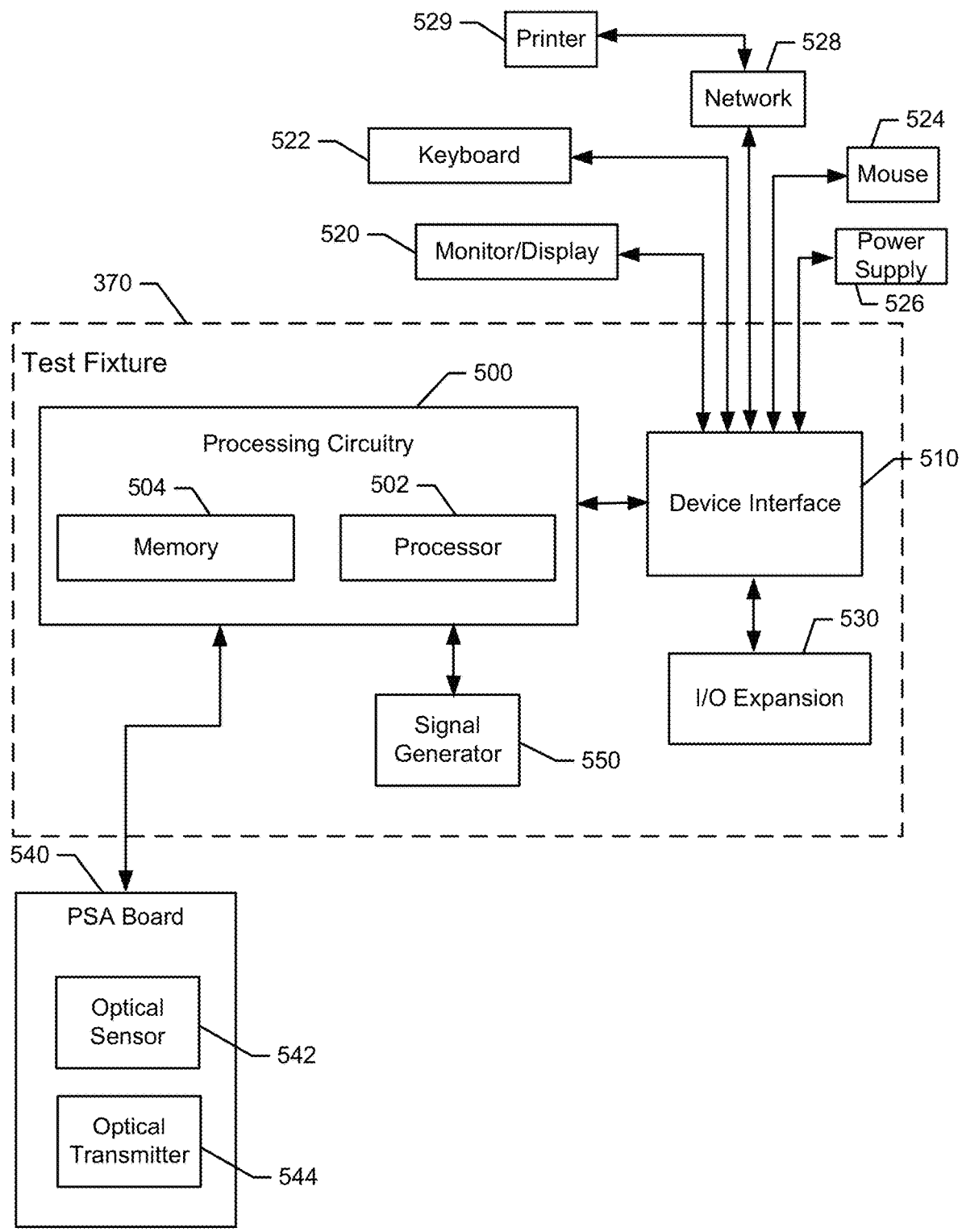
FIG. 5 is a functional block diagram of a test fixture in accordance with an example embodiment.

FIG. 5 illustrates a functional block diagram of various components of the test fixture 370 of an example embodiment. The test fixture 370 may include processing circuitry 500 configured to perform data processing, control function execution and/or other processing and management services according to an example embodiment. In some embodiments, the processing circuitry 500 may be embodied as a chip or chip set. In other words, the processing circuitry 500 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 500 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 500 may include one or more instances of a processor 502 and memory 504 that may be in communication with or otherwise control a device interface 510. As such, the processing circuitry 500 may be embodied as a circuit chip (e.g., an integrated circuit chip) configured (e.g., with hardware, software or a combination of hardware and software) to perform operations described herein. However, in some embodiments, the processing circuitry 500 may be embodied as a portion of an on-board computer.

The device interface 510 may include one or more interface mechanisms for enabling communication with other devices (e.g., modules, entities, and/or other components of the test fixture 370, or the like). In some cases, the device interface 510 may be any means such as a device or circuitry embodied in either hardware, or a combination of hardware and software that is configured to receive and/or transmit data from/to modules, entities, and/or other components that are in communication with the processing circuitry 500 (directly or indirectly).

The device interface 510 may, in some cases, connect the processing circuitry 500 to internal and/or external components that combine to form a user interface for the test fixture 370. In FIG. 5, those user interface components are shown to include a monitor/display 520, a keyboard 522, and a mouse 524. The mouse 524 and keyboard 522 may be operably coupled to the processing circuitry 500 via standard connections (e.g., USB) or via proprietary means. Similarly, the monitor/display 520 may have any of a number of connection means including, for example, HDMI. Moreover, the device interface 510 may also or alternatively be operably coupled to other components that provide an audible, visual, mechanical or other output to the user such as, for example, speakers, switches, indicator lights, buttons or keys (e.g., function buttons), and/or other input/output mechanisms.

In some embodiments, the device interface 510 may also operably couple the test fixture 370 to a power supply 526. Thus, for example, the device interface 510 may include power control circuitry for converting AC to DC power (or vice versa) to power the electrical components of the test fixture 370. Thus, the power supply 526 could be mains power or battery power, regardless of the individual power needs of the components of the test fixture 370.

In some embodiments, the device interface 510 may also be operably coupled the test fixture 370 to external components for analysis, remote monitoring, or other purposes via a network 528 that may be operably coupled to the processing circuitry 500 via Ethernet or other networking technologies. The network 528 may be a local, private, public, or other communication network including, for example, a local area network (LAN) or the Internet. In some cases, the test fixture 370 may include an input/output (I/O) expansion port 530. The input/output expansion port 530 may enable any of a number of additional devices, components, or modules to be operably coupled to the test fixture 370. Thus, for example, the input/output port 530 could be used to connect the test fixture 370 directly to external devices (i.e., without a network connection) or may be used to expand the capacity of the test fixture 370 by enabling scaling of the number of testing modules 374 to which the test fixture 370 can be coupled. In some cases, the input/output expansion port 530 may be operably coupled to a printer 529, which may be used to print the unique ID of each individual one of the devices. However, the printer 529 could alternatively be located in or accessed via the network 528. As noted above, the unique ID may be used to generate the proper unique unlock code for each respective different instance of the device 300. Thus, the consumer or end user will need the unique ID in order to generate (e.g., via the host device 330) the correct unique unlock code to operate the lock assembly 360. By providing a printed label or other printed version of the unique ID, the information can be provided to the consumer or end user with the product after confirmation (by the test fixture 370) that the unique unlock code corresponding to the unique ID does indeed work to unlock the lock assembly 360.

The processor 502 may be embodied in a number of different ways. For example, the processor 502 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 502 may be configured to execute instructions stored in the memory 504 or otherwise accessible to the processor 502. As such, whether configured by hardware or by a combination of hardware and software, the processor 502 may represent an entity (e.g., physically embodied in circuitry—in the form of processing circuitry 500) capable of performing operations according to example embodiments while configured accordingly. Thus, for example, when the processor 502 is embodied as an ASIC, FPGA or the like, the processor 502 may be specifically configured hardware for conducting the operations described herein. Alternatively, as another example, when the processor 502 is embodied as an executor of software instructions, the instructions may specifically configure the processor 502 to perform the operations described herein associated with testing functional PSA capabilities.

In an example embodiment, the processor 502 (or the processing circuitry 500) may be operably coupled to and control the operation of a PSA board 540. In this regard, based on inputs received by the processing circuitry 500 responsive to insertion of a power unit into a cavity 376 of the test fixture 370, the processing circuitry 500 may initiate the performance of testing via the PSA board 540 associated with the cavity 376. As such, in some embodiments, the processor 502 (or the processing circuitry 500) may be said to cause each of the operations described in connection with the PSA board 540 in relation to generating/receiving and processing information associated with locking/unlocking the lock assembly 360 as described herein responsive to execution of instructions or algorithms configuring the processor 502 (or processing circuitry 500) accordingly.

In an exemplary embodiment, the memory 504 may include one or more non-transitory memory devices such as, for example, volatile and/or non-volatile memory that may be either fixed or removable. The memory 504 may be configured to store information, data, applications, instructions or the like for enabling the processing circuitry 500 to carry out various functions in accordance with exemplary embodiments of the present invention. For example, the memory 504 could be configured to buffer input data for processing by the processor 502. Additionally or alternatively, the memory 504 could be configured to store instructions for execution by the processor 502. As yet another alternative, the memory 504 may include one or more databases that may store a variety of data sets responsive to operation of the PSA board 540. Among the contents of the memory 504, applications and/or instructions may be stored for execution by the processor 502 in order to carry out the functionality associated with each respective application/instruction. In some cases, the applications may include instructions for providing inputs to control operation of the PSA board 540 as described herein. Alternatively or additionally, the applications may include instructions for embodying a signal generator 550 that is configured to generate the signal format 400 as described above. Thus, the signal generator 550 may be any means or device that is configured to generate the signal format 400 for transmission as part of the test signaling 372 described above.

In an example embodiment, the memory 504 may store data associated with signaling used for locking/unlocking the lock assembly 360 for analysis or debugging. Thus, for example, the memory 504 may store signaling parameters or characteristics that may be used to analyze why a particular test associated with a particular one of the devices 300 failed by comparing such parameters or characteristics to those associated with other devices that passed. The memory 504 may further store instructions for defining how to store testing information, how to aggregate or process such information, and/or how to represent such information on the monitor/display 520 or other output devices.

As shown in FIG. 5, the PSA board 540 may include an optical sensor 542 and an optical transmitter 544. However, it should be appreciated that to the extent audible signals are used, audio transmitters and receivers could replace the optical transmitter 544 and optical sensor 542, respectively, and in some cases, a combination of optical and audio transmitters and/or receivers may be used. The optical transmitter 544 may be configured to transmit optical signals to the device 300 when inserted into the cavity, and the optical sensor 542 may be configured to receive optical signals or feedback from the device 300 in the cavity. In some cases, only the optical transmitter 544 may be employed, and the optical sensor 542 may be omitted. The optical transmitter 544 and optical sensor 542 (if employed) may be placed proximate to the cavity to enable transmission of signals generated based on operation of the signal generator 550 to the device 300 via the test fixture 370 and the PSA board 540.

Figure 6:
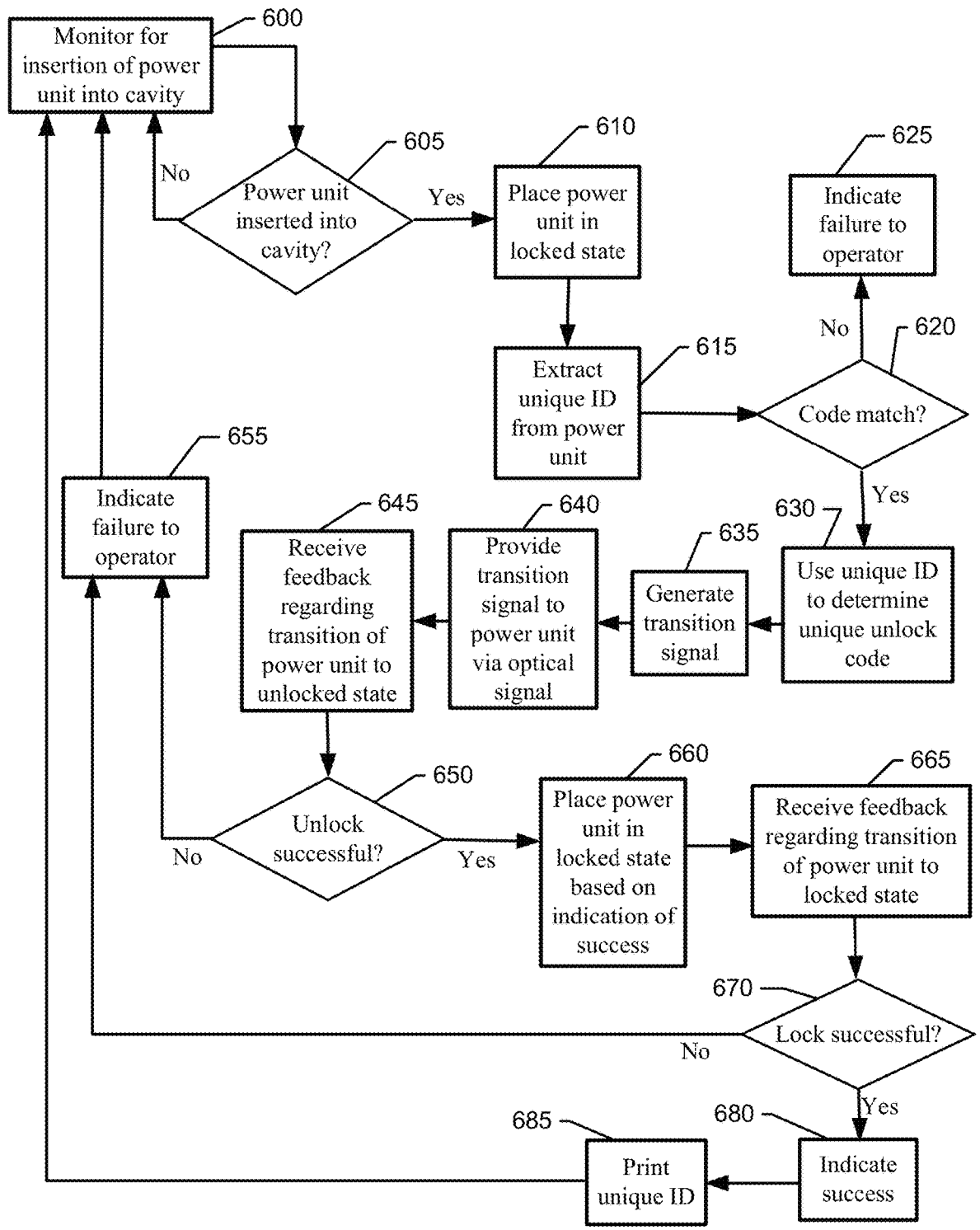
FIG. 6 is a method of providing a transition signal in accordance with an example embodiment.

FIG. 6 illustrates a block diagram of a method of functionally testing a state transition capability (e.g., for locking and unlocking) of an aerosol provision device (e.g., a power unit thereof) according to an example embodiment. The method of FIG. 6 may be performed by the test fixture 370 described above. As shown in FIG. 6, the method may include an initial operation of monitoring for insertion of a power unit into a cavity of the test fixture at operation 600. Operation 605 represents a decision block associated with the monitoring of operation 600. In this regard, failure to detect any power unit in the cavity may cause a loop back to operation 600. Meanwhile, if insertion is positively detected (e.g., via a change in resistance associated with making electrical connections of the test fixture 370 with power pins in the power unit), then the power unit may be confirmed or otherwise placed into the locked state at operation 610. In an example embodiment, the action of operation 610 may be automatically performed responsive to a positive result in operation 605. In some cases, as noted above, the placement of the power unit in the locked state may occur through signaling provided via the power pins of the power unit. The power pins, or any other suitable connection to the onboard microcontroller or processing circuitry of the power unit, may then be used by the test fixture 370 to extract the unique ID from the power unit at operation 615. The unique ID may be, for example, a unique six digit identification number for the power unit that may be assigned by the manufacturer as described above. Although not required, in some cases, an optional check may be conducted to determine whether the extracted unique ID matches a provided identifier (e.g., provided by the manufacturer). The provided identifier may, in some cases, be captured electronically by a reader or scanner. For example, a reader or scanner may be embodied as a camera, or other light or optical detector. In one example, the user may capture a picture of an identifier (e.g., bar code) associated with the power unit. Example bar codes may include any type of scannable identifier, such as a universal product code (UPC), data matrix code, and/or a quick response (QR) code. The code may include any one-dimensional (1D) codes, two-dimensional (2D) codes, three-dimensional (3D) codes, or other types of codes. In any case, the unique ID extracted from the power unit may be compared to the provided identifier at operation 620. If there is not a match, the operator may be informed at operation 625. The operator may then take any appropriate corrective action. However, if there is a match, flow may proceed to operation 630.

Operation 630 may include employing the unique ID to determine a corresponding unique unlock code for operation of the lock assembly 360 as described above. Thus, for example, a lookup table may be used to determine the unique unlock code, or the unique unlock code may be derived from the unique ID. In any case, after the unique unlock code is determined, the signal generator 550 may utilize the signal format 400 described above to generate a transition signal at operation 635. In this regard, the transition signal may include the data portion 440 described above, which is generated based on the unique unlock code. The transition signal also includes the length indicator 430, which provides information on the length of the data portion 440 and device/key field 450 while indicating whether a device identifier and/or key identification information are included in the transition signal.

In an example embodiment, the transition signal may then be provided to the power unit via an optical (or other) signal at operation 640. Accordingly, the unique unlock code may be provided to the power unit via the optical signaling from the test fixture in the form of the transition signal at operation 640. After receiving the transition signal and using the length indicator 430 to efficiently extract the unique unlock code, the power unit may provide feedback to the test fixture. As such, at operation 645, the test fixture 370 may receive the feedback regarding the transition of the power unit to the unlocked state (or acceptance of the unique unlock code). The feedback may come, for example, in the form of a flashing light sequence or other optical indication that may be provided from the power unit to the test fixture 370. A determination may be made regarding the feedback provided (e.g., whether the feedback indicates pass or fail) at operation 650. If unlock fails, and the feedback provided to the operator indicates the failure, as shown at operation 655, the operator may take any suitable actions in response and the flow may also return to operation 600. If instead the feedback indicates the success of the unlock operation, then the test fixture 370 may be configured to place the power unit back in the locked state responsive to the positive feedback at operation 660. The transition to the locked state may be conducted as noted above in relation to operation 610.

In an example embodiment, the power unit may again provide feedback regarding the transition to the locked state at operation 665, so a determination can be made at operation 670 as to whether the locking operation was also successful. If the locking operation fails, then an indication may be provided to the operator and flow may return to operation 655. However, if the locking operation is successful, an indication of the success may be provided (e.g., via visual or audible feedback to the operator) at operation 680. In some cases, the indication of success may then trigger operation 685, which may include provision of the unique ID to a printer. The unique ID may then be placed on a sticker or other material that may accompany the power unit when sold or transferred. In some embodiments, the unique ID may be provided as a bar code or other coded visual element that can be scanned by the host device 330 to conduct PSA.

Operations 600-685 may be considered to define a functional unlock test of a power unit. Each individual step of the functional unlock test may be monitored, recorded and/or reported either alone or in groups. In some cases, multiple test modules may be employed to enable multiple instances of the functional unlock test to be conducted in parallel for a plurality of power units inserted into respective cavities. Moreover, the parallel testing may be conducted simultaneously, but also entirely independent of one another, and therefore asynchronously. Because each of the cavities has its own independently operable light source (e.g., optical transmitter 544), independent and asynchronous testing is possible. In this regard, for example, in an example of the test fixture 370 shown herein with multiple cavities, the operator may insert a power unit in any number of the cavities (e.g., one, two, three, four or five). The operator may wait until all cavities that are to be filled have been filled, and then start the testing in sequence for each cavity (i.e., starting each cavity one by one in order). The operator may then wait until all tests are complete before replacing the tested power units with untested power units and completing the process described above. The control console of some embodiments may even have a bulk, or simultaneous start operator, which allows the operator to start multiple tests at the same time (and with one button push).

However, as an alternative, the operator could instead insert one power unit and start its test, and then insert another power unit (e.g., in an adjacent cavity) and start testing on the other power unit, and do this process in sequence until either all cavities are full, or one or more of the tests are completed. The operator can manage inserting power units, starting testing and replacing tested power units with untested ones in any order or arrangement desired.

Some example embodiments may provide a test fixture for testing aerosol provision devices. The test fixture may include one or more testing modules including a cavity configured to receive a portion of an aerosol provision device, and processing circuitry operably coupled to the one or more testing modules. The processing circuitry may be configured to provide a transition signal to the aerosol provision device to transition the aerosol provision device between an initial state and a transitioned state during a functional test controlled by the processing circuitry. The transition signal may have a message format comprising a plurality of fields including a data portion, and a length indicator. The length indicator may indicate an anticipated length of the transition signal based on providing information on contents of one or more other fields of the message format. In the example above, the transitions may be between locked and unlocked states. Accordingly, as used herein, the terms locked state and unlocked state are examples of states between which the test fixture may be configured to transition one or more assemblies (such as the lock assembly). Other assemblies and other states may also be included in example embodiments without departing from the spirit and scope of the disclosure provided herein, and the corresponding claims.

The test fixture may include a number of modifications, augmentations, or optional additions, some of which are described herein. The modifications, augmentations or optional additions listed below may be added in any desirable combination. Within this context, the system as described above may be considered a first embodiment, and other embodiments may be defined by each respective combination of modifications, augmentations or optional additions. For example, a second embodiment may be defined in which the length indicator includes a segment defining a level of encryption of the data portion. Alternatively or additionally, a third embodiment may be defined in which the level of encryption is a selected one of either no encryption, 32-bit encryption, 64-bit encryption and 128-bit encryption. In an example embodiment, a fourth embodiment may be defined in which the length indicator includes a segment defining whether a device identifier corresponding to the aerosol provision device is included in a device portion of the message format. The fourth embodiment may be combined with any or all of embodiments one to two. In some examples, a fifth embodiment may be defined in which the device identifier is associated with a batch of unique identifiers of respective individual instances of the aerosol provision devices. The fifth embodiment may be combined with any or all of embodiments one to four. In an example embodiment, a sixth embodiment may be defined in which the length indicator includes a segment defining whether key identification information is included in a key portion of the message format. The sixth embodiment may be combined with any or all of embodiments one to five. In some examples, a seventh embodiment may be defined in which the length indicator includes a first segment defining a level of encryption of the data portion, a second segment defining whether a device identifier corresponding to the aerosol provision device is included in a device portion of the message format, and a third segment defining whether key identification information is included in a key portion of the message format. The seventh embodiment may be combined with any or all of embodiments one to six. In an example embodiment, an eighth embodiment may be defined in which the length indicator indicates the anticipated length of the transition signal based on an accumulation of respective lengths indicated by the first, second and third segments. The eighth embodiment may be combined with any or all of embodiments one to seven. In some examples, a ninth embodiment may be defined in which the length indicator indicates the anticipated length of the transition signal based on an accumulation of an indication of contents of the data portion relating to encryption, and of contents of a device/key field including information associated with a device identifier and information relating to key identification information. The ninth embodiment may be combined with any or all of embodiments one to eight. In an example embodiment, a tenth embodiment may be defined in which the device/key field is disposed between a first data portion of the data portion and a second data portion of the data portion. The tenth embodiment may be combined with any or all of embodiments one to nine. In some examples, an eleventh embodiment may be defined in which contents of the data portion are split between most significant bits and least significant bits, and the most significant bits are disposed in the first data portion and the least significant bits are disposed in the second data portion. The eleventh embodiment may be combined with any or all of embodiments one to ten. In some examples, a twelfth embodiment may be defined in which the data portion includes a unique unlock code determined based on a unique identifier of the aerosol provision device. The twelfth embodiment may be combined with any or all of embodiments one to eleven. In some examples, a thirteenth embodiment may be defined in which the key identification information identifies a selected key among a plurality of keys stored in the power unit. The thirteenth embodiment may be combined with any or all of embodiments one to twelve. In some examples, a fourteenth embodiment may be defined in which the selected key is used to decrypt the unique unlock code. The fourteenth embodiment may be combined with any or all of embodiments one to thirteen.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A test fixture for testing aerosol provision devices, the test fixture comprising:
   one or more testing modules including a cavity configured to receive at least a portion of an aerosol provision device; and
   processing circuitry operably coupled to the one or more testing modules,
   wherein the processing circuitry is configured to provide a transition signal to the aerosol provision device to transition the aerosol provision device between an initial state and a transitioned state during a functional test controlled by the processing circuitry,
   wherein the transition signal has a message format comprising a plurality of fields including a data portion, and a length indicator, and
   wherein the length indicator indicates an anticipated length of the transition signal based on providing information on contents of one or more other fields of the message format.

2. The test fixture of claim 1, wherein the length indicator includes a segment defining a level or type of encryption of the data portion.

3. The test fixture of claim 2, wherein the level of encryption is a selected one of either no encryption, 32-bit encryption, 64-bit encryption, 128-bit encryption and 256-bit encryption.

4. The test fixture of claim 2, wherein the type of encryption is determined from a lookup table correlating different types of encryption to respective different segment values of the length indicator.

5. The test fixture of claim 1, wherein the length indicator includes a segment defining whether a device identifier corresponding to the aerosol provision device is included in a device portion of the message format.

6. The test fixture of claim 5, wherein the device identifier is associated with a batch of unique identifiers of respective individual instances of the aerosol provision devices.

7. The test fixture of claim 1, wherein the length indicator includes a segment defining whether key identification information is included in a key portion of the message format.

8. The test fixture of claim 1, wherein the length indicator includes a first segment defining a level of encryption of the data portion, a second segment defining whether a device identifier corresponding to the aerosol provision device is included in a device portion of the message format, and a third segment defining whether key identification information is included in a key portion of the message format.

9. The test fixture of claim 8, wherein the length indicator indicates the anticipated length of the transition signal based on an accumulation of respective lengths indicated by the first, second and third segments.

10. The test fixture of claim 1, wherein the length indicator indicates the anticipated length of the transition signal based on an accumulation of an indication of contents of the data portion relating to encryption, and of contents of a device/key field including information associated with a device identifier and information relating to key identification information.

11. The test fixture of claim 10, wherein the device/key field is disposed between a first data portion of the data portion and a second data portion of the data portion.

12. The test fixture of claim 11, wherein contents of the data portion are split between most significant bits and least significant bits, and
    wherein the most significant bits are disposed in the first data portion and the least significant bits are disposed in the second data portion.

13. The test fixture of claim 10, wherein the data portion includes a unique unlock code determined based on a unique identifier of the aerosol provision device.

14. The test fixture of claim 13, wherein the key identification information identifies a selected key among a plurality of keys stored in the power unit.

15. The test fixture of claim 14, wherein the selected key is used to decrypt the unique unlock code.

* * * * *